United States Patent
Denoual et al.

(10) Patent No.: US 11,190,791 B2
(45) Date of Patent: Nov. 30, 2021

(54) DESCRIPTION OF IMAGE COMPOSITION WITH HEVC STILL IMAGE FILE FORMAT

(71) Applicant: Canon Kabushiki Kaisha, Tokyo (JP)

(72) Inventors: Franck Denoual, Saint Domineuc (FR); Frederic Maze, Langan (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/737,683

(22) Filed: Jan. 8, 2020

(65) Prior Publication Data

US 2020/0145684 A1    May 7, 2020

Related U.S. Application Data

(63) Continuation of application No. 16/195,667, filed on Nov. 19, 2018, now Pat. No. 10,567,784, which is a continuation of application No. 15/872,867, filed on Jan. 16, 2018, now Pat. No. 10,298,947, which is a continuation of application No. 14/881,063, filed on Oct. 12, 2015, now Pat. No. 9,906,807.

(30) Foreign Application Priority Data

Oct. 14, 2014 (GB) ................................. 1418203

(51) Int. Cl.
*H04N 19/46* (2014.01)
*H04N 21/236* (2011.01)
*H04N 21/845* (2011.01)

(52) U.S. Cl.
CPC .......... *H04N 19/46* (2014.11); *H04N 21/236* (2013.01); *H04N 21/845* (2013.01)

(58) Field of Classification Search
CPC ..... H04N 19/46; H04N 21/236; H04N 21/845
See application file for complete search history.

(56) References Cited

U.S. PATENT DOCUMENTS

2003/0231188 A1* 12/2003 Cohen ...................... G06F 8/63
345/629

FOREIGN PATENT DOCUMENTS

WO      2014/002497 A1    1/2014

* cited by examiner

*Primary Examiner* — Nam D Pham
(74) *Attorney, Agent, or Firm* — Canon U.S.A., Inc. IP Division

(57) ABSTRACT

A method of encapsulating an encoded bitstream representing one or more images includes providing description of images and/or sub-image picture, providing composed picture description, and outputting the bitstream. The description of images and/or sub-image pictures identifying portions of the bitstream representing the images and/or sub-images of the one or more images is provided. The composed picture description of at least one composed picture formed by one or more images and/or sub-image pictures also is provided. The bitstream, together with the composed picture description, is output as an encapsulated data file.

52 Claims, 11 Drawing Sheets

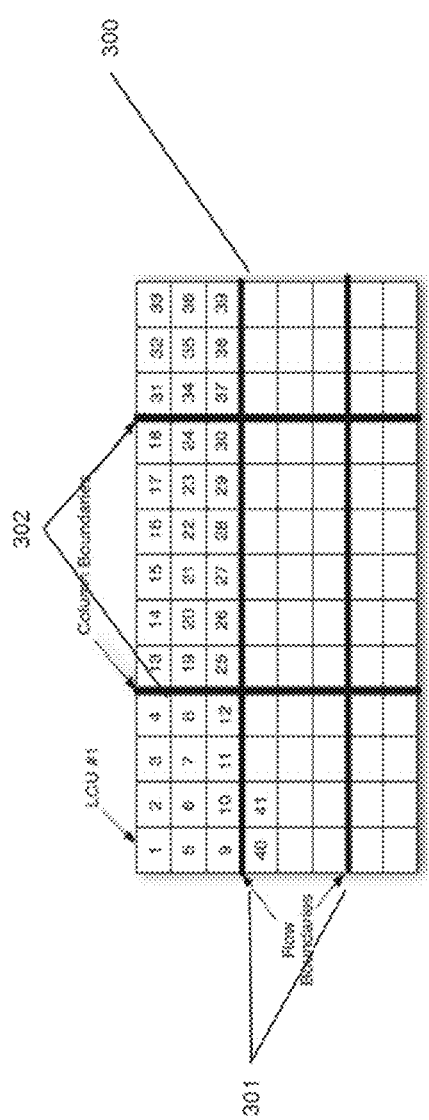
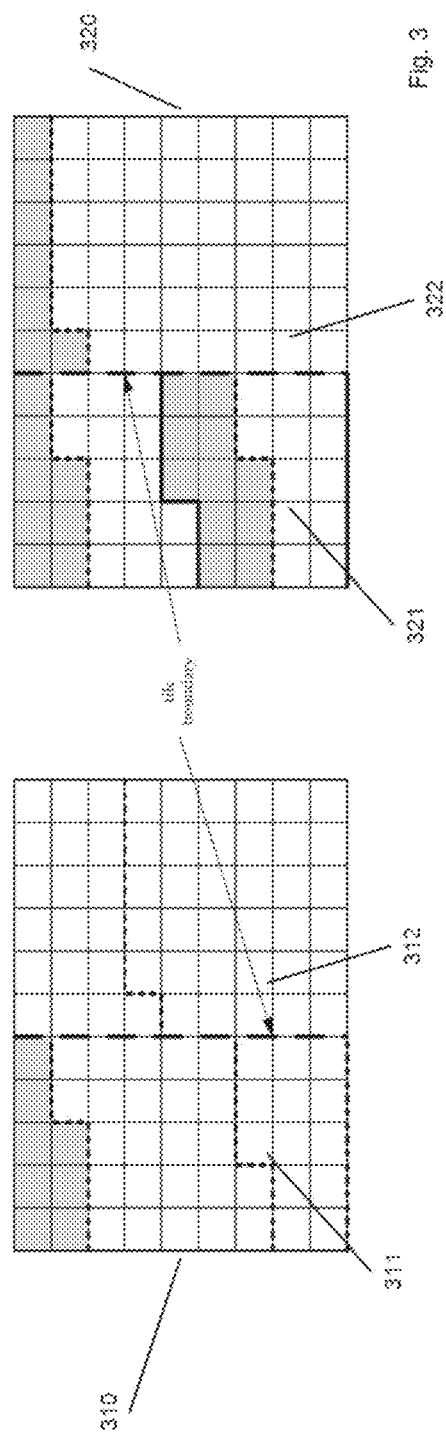
Fig. 3

```
aligned(8) class ItemInfoBox
extends FullBox('iinf', version = 0, 0){
    unsigned int(16) entry_count;
    ItemInfoEntry[ entry_count ] item_infos;
}
```
500

```
aligned(0) class ItemInfoEntry extends FullBox('infe', version, 0) {
    if ((version == 0) || (version == 1)) {
        unsigned int(16) item_ID;
        unsigned int(16) item_protection_index
        string item_name;
        string content_type;
        string content_encoding; //optional
    }
    if (version == 1) {
        unsigned int(32) extension_type; //optional
        ItemInfoExtension(extension_type); //optional
    }
    if (version == 2) {
        unsigned int(16) item_ID;
        unsigned int(16) item_protection_index,
        unsigned int(32) item_type;
        string item_name;
        if (item_type== 'mime' ) {
            string content_type;
            string content_encoding; //optional
        } else if (item_type == 'uri ') {
            string item_un_type;
        }
    }
}
```

DESCRIPTION OF IMAGE COMPOSITION WITH HEVC STILL IMAGE FILE FORMAT

REFERENCE TO RELATED APPLICATIONS

This application is a continuation of U.S. patent application Ser. No. 16/195,667, filed Nov. 19, 2018, which is a continuation of U.S. patent application Ser. No. 15/872,867, filed Jan. 16, 2018 and now U.S. Pat. No. 10,298,947, issued May 21, 2019, which is a continuation of U.S. patent application Ser. No. 14/881,063, filed Oct. 12, 2015 and now U.S. Pat. No. 9,906,807, issued Feb. 27, 2018, which claims the benefit of United Kingdom Application No. 1418203.4, filed Oct. 14, 2014, all of which are hereby incorporated by reference herein in their entirety.

BACKGROUND OF THE INVENTION

Field of the Invention

The present invention relates to the storage of image data, such as still images, bursts of still images, compositions or cropping of images or video data in a media container with descriptive metadata. Such metadata generally provides easy access to the image data and portions of the image data.

Description of the Related Art

Some of the approaches described in this section could be pursued, but are not necessarily approaches that have been previously conceived or pursued. Therefore, the approaches described in this section are not necessarily prior art to the claims in this application and are not admitted to be prior art by inclusion in this section.

The HEVC standard defines a profile for the encoding of still images and describes specific tools for compressing single still images or bursts of still images. An extension of the ISO Base Media File Format (ISOBMFF) used for such kind of image data has been proposed for inclusion into the ISO/IEC 23009 standard, in Part 12, under the name: "Image File Format". The standard covers two forms of storage corresponding to different use cases:

the storage of image sequences, with timing that is optionally used at the decoder, and in which the images may be dependent on other images, and the storage of single images, and collections of independently coded images.

In the first case, the encapsulation is close to the encapsulation of the video tracks in the ISO Base Media File Format (see document «Information technology—Coding of audio-visual objects—Part 12: ISO base media file format», ISO/IEC 14496-12:2012, Fourth edition, September 2012), and the same tools and concepts are used, such as the 'trak' boxes and the sample grouping for description. The 'trak' box is a file format box that contains sub boxes for describing a track, that is to say, a timed sequence of related samples.

In the second case, a set of ISOBMFF boxes, the 'meta' boxes are used. These boxes and their hierarchy offer less description tools than the 'track' boxes and relate to "information items" or "items" instead of related samples.

The image file format can be used for locally displaying multimedia files or for streaming multimedia presentations. HEVC Still Images have many applications which raise many issues.

Image bursts are one application. Image bursts are sequences of still pictures captured by a camera and stored as a single representation (many picture items referencing a block of data). Users may want to perform several types of actions on these pictures: select one as thumbnail or cover, apply effects on these pictures or the like.

There is thus a need for descriptive metadata for identifying the list of pictures with their corresponding bytes in the block of data.

Computational photography is another application. In computational photography, users have access to different resolutions of the same picture (different exposures, different focuses etc.). These different resolutions have to be stored as metadata so that one can be selected and the corresponding piece of data can be located and extracted for processing (rendering, editing, transmitting or the like).

With the increase of picture resolution in terms of size, there is thus a need for providing enough description so that only some spatial parts of these large pictures can be easily identified and extracted. Various arrangements of image spatial parts can then produce new images through composition and/or cropping.

Another kind of applications is the access to specific pictures from a video sequence, for instance for video summarization, proof images in video surveillance data or the like.

For such kind of applications, there is a need for image metadata enabling to easily access the key images, in addition to the compressed video data and the video tracks metadata.

In addition, professional cameras have reached high spatial resolutions. Videos or images with 4K2K resolution are now common. Even 8 k4 k videos or images are now being common. In parallel, video are more and more played on mobile and connected devices with video streaming capabilities. Thus, splitting the videos into tiles becomes important if the user of a mobile device wants to display or wants to focus on sub-parts of the video by keeping or even improving the quality. By using tiles, the user can therefore interactively request spatial sub-parts of the video.

There is thus a need for describing these spatial sub-parts of the video in a compact fashion in the file format in order to be accessible without additional processing other than simply parsing metadata boxes. For images corresponding to the so-described videos it is also of interest for the user to access to spatial sub-parts. As well, for images resulting from cropping and/or composition of these spatial sub-parts, it is also of interest for the user to access these pictures.

The ISO/IEC 23008 standard covers in its part 12 two ways for encapsulating still images into the file format that have been recently discussed.

One way is based on 'track' boxes, and the notion of timed sequence of related samples with associated description tools, and another is based on 'meta' boxes, based on information items, instead of samples, providing less description tools, especially for region of interest description and tiling support.

There is thus a need for providing tiling support in the new Image File Format.

The use of tiles is commonly known in the prior art, especially at compression time. Concerning their indexation in the ISO Base Media File format, tiling descriptors exist in drafts for amendment of Part 15 of the ISO/IEC 14496 standard "Carriage of NAL unit structured video in the ISO Base Media File Format".

However, these descriptors rely on 'track' boxes and sample grouping tools and cannot be used in the Still Image File Format when using the 'meta' based approach. Without such descriptors, it becomes complicated to select and extract tiles from a coded picture stored in this file format.

FIG. 1 illustrates the description of a still image encoded with tiles in the 'meta' box (100) of ISO Base Media File Format, as disclosed in MPEG contribution m32254.

An information item is defined for the full picture 101 in addition to respective information items for each tile picture (102, 103, 104 and 105). The box (106), called 'ItemReferenceBox', from the ISO BMFF standard is used for indicating that a 'tile' relationship (107) exists between the information item of the full picture and the four information items corresponding to the tile pictures (108). Identifiers of each information item are used so that a box (109), called 'ItemLocationBox', provides the byte range(s) in the encoded data (110) that represent each information item. Another box "ItemReferenceBox'" (112) is used for associating EXIF metadata (111) with the information item for the full picture (101) and a corresponding data block (111) is created in the media data box (110). Also, an additional information item (113) is created for identifying the EXIF metadata.

Even if the full picture and its tiles are introduced as information items, no tiling information is provided here. Moreover, when associating additional metadata with an information item (like EXIF), no data block referenced using an additional ItemReferenceBox' is created.

Reusing information on tiling from EXIF and reusing the mechanism defined in the Still Image File format draft wouldn't make it possible to describe non-regular grid with existing EXIF tags.

Thus, there is still a need for improvements in the file format for still images, notably HEVC still images. In particular, there is a need for methods for extracting a region of interest in still Images stored with this file format. The invention lies within the above context.

SUMMARY OF THE INVENTION

According to an aspect of the present invention, a method of encapsulating an encoded bitstream representing one or more images includes providing description of images and/or sub-image pictures identifying portions of the bitstream representing the images and/or sub-images of the one or more images, providing composed picture description of at least one composed picture formed by one or more images and/or sub-image pictures, and outputting the bitstream together with the composed picture description as an encapsulated data file.

Other features and advantages of the invention will become apparent from the following description of non-limiting exemplary embodiments, with reference to the appended drawings.

BRIEF DESCRIPTION OF THE DRAWINGS

FIG. 3 illustrates various tile/slice configurations in HEVC;

FIG. 5 illustrates the standard metadata for describing information items in 'meta' boxes of the ISOBMFF;

DETAILED DESCRIPTION OF THE INVENTION

In what follows, embodiments of the invention are described.

Figure 1:
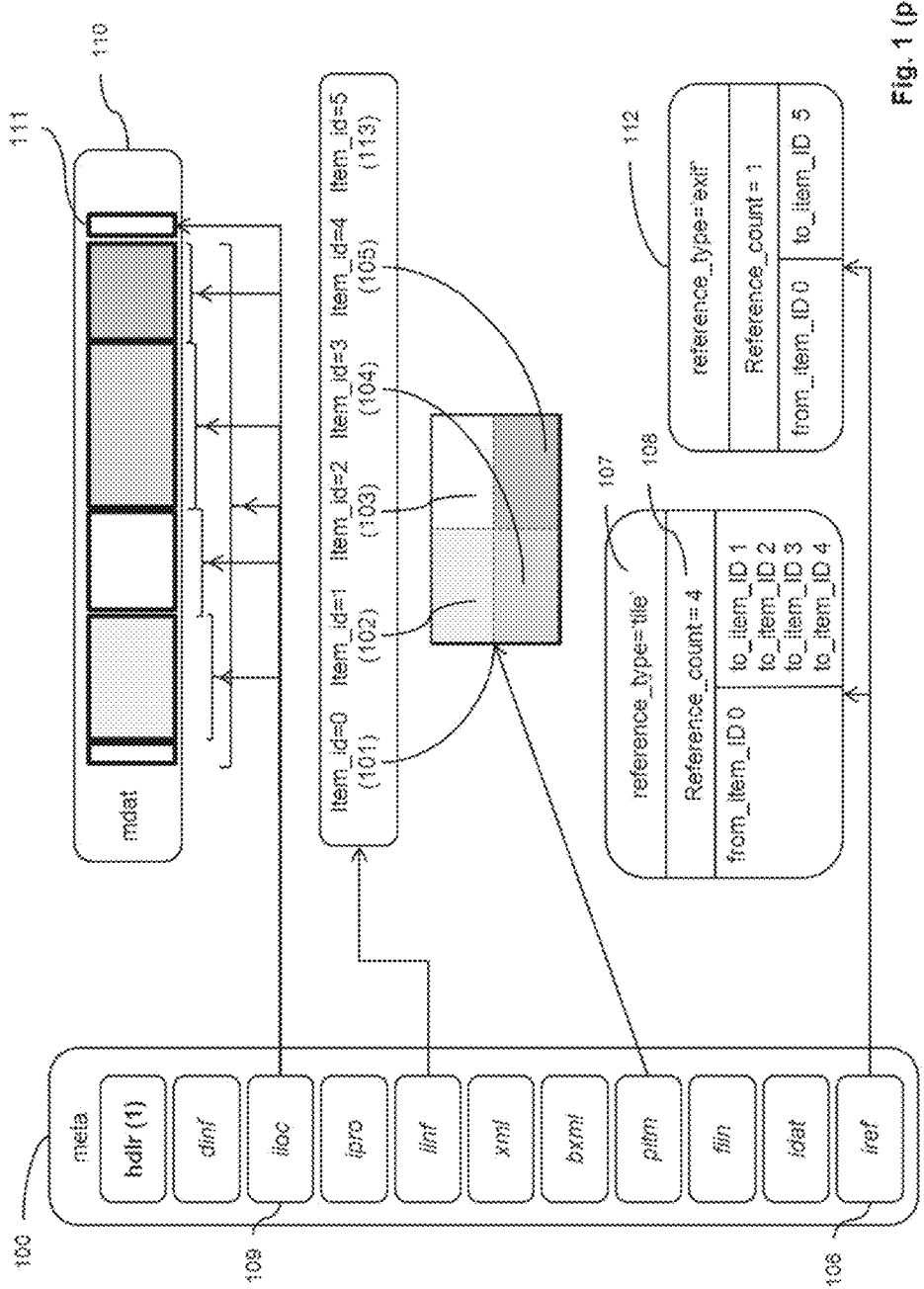
FIG. 1 illustrates the description of a still image encoded with tiles in the 'meta' box (100) of ISO Base Media File Format, as disclosed in MPEG contribution m32254.
Figure 2:
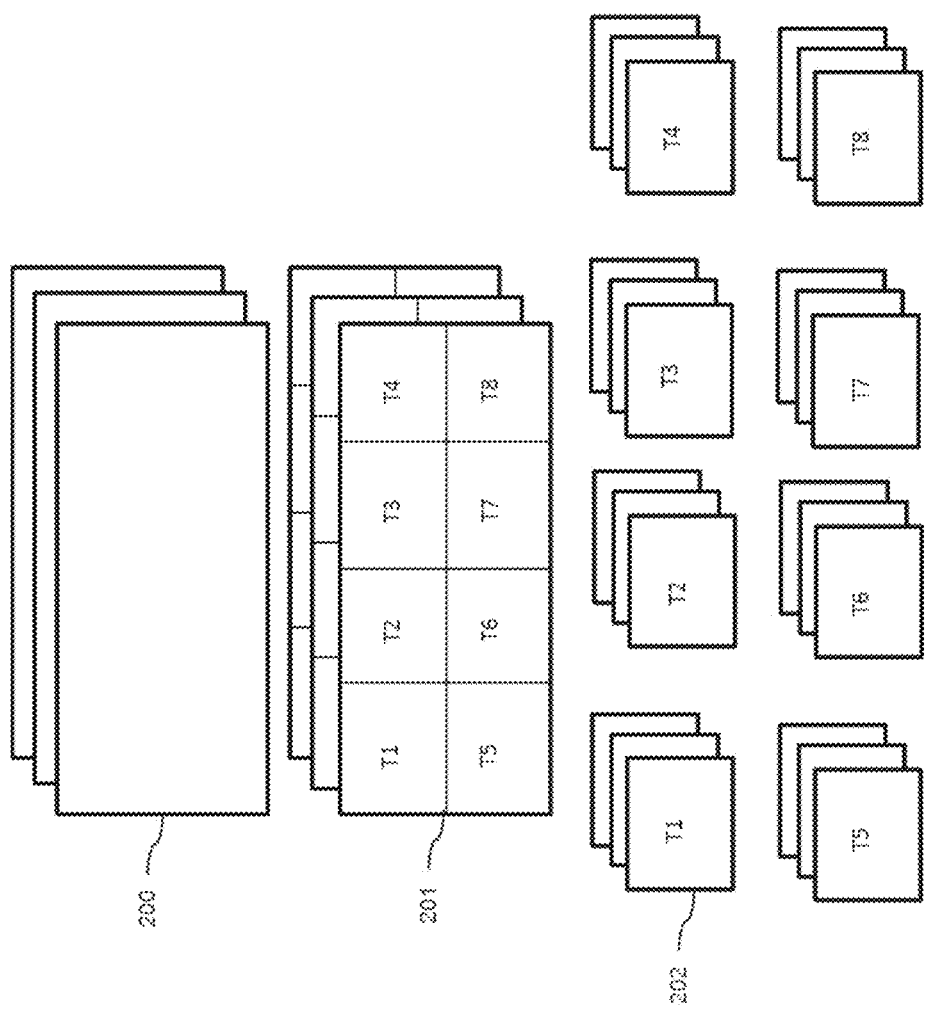
FIG. 2 illustrates an example of a tiled video.

In order to better understand the technical context, video tiling is explained with reference to FIG. 2 which shows a video (200) having consecutive temporal frames. Each frame (201) is divided into 8 portions (here rectangular portions) referred to as "tiles" T1 to T8. The number and the shape of the tiles can be different. In what follows, it is considered that the tiling is the same whatever the index of the video frame.

The result of this tiling is 8 independent sub-videos (202). These sub-videos represent a partition of the whole global video. Each independent sub-video can be encoded as an independent bitstream, according to the AVC or HEVC standards for example. The sub-video can also be part of one single video bitstream, like for example tiles of the HEVC standard or slices of the AVC standard.

The HEVC standard defines different spatial subdivision of pictures: tiles, slices and slice segments. These different subdivisions (or partitions) have been introduced for different purposes: the slices are related to streaming issues while the tiles and the slice segments have been defined for parallel processing.

A tile defines a rectangular region of a picture that contains an integer number of Coding Tree Units (CTU). FIG. 3 shows the tiling of an image (300) defined by row and column boundaries (301, 302). This makes the tiles good candidates for regions of interest description in terms of position and size. However, the HEVC standard bitstream organization in terms of syntax and its encapsulation into Network Abstract Layer (NAL) units is rather based on slices (as in AVC standard).

According to the HEVC standard, a slice is a set of slice segments, with at least the first slice segment being an independent slice segment, the others, if any, being dependent slice segments. A slice segment contains an integer number of consecutive CTUs (in the raster scan order). It has not necessarily a rectangular shape (thus less appropriate than tiles for region of interest representation). A slice segment is encoded in the HEVC bitstream as a header called "slice_segment_header" followed by data called "slice_segment_data". Independent slice segments and dependent slice segments differ by their header: dependent slice segments have a shorter header because they reuse information from the independent slice segment's header. Both independent and dependent slice segments contain a list of entry points in the bitstream: either to tiles or to entropy decoding synchronization points.

FIG. 3 shows different configurations of images 310 and 320 of slice, slice segments and tiles. These configurations differ from the configuration of image 300 in which one tile has one slice (containing only one independent slice segment). Image 310 is partitioned into two vertical tiles (311, 312) and one slice (with 5 slice segments). Image 320 is split into two tiles (321, 322), the left tile 321 having two slices (each with two slice segments), the right tile 322 having one slice (with two slice segments). The HEVC standard defines organization rules between tiles and slice segments that can be summarized as follows (one or both conditions have to be met):

All CTUs in a slice segment belong to the same tile, and
All CTUs in a tile belong to the same slice segment In order to have matching region of interest support and transport, the configuration 300, wherein one tile contains one slice with one independent segment, is preferred. However, the encapsulation solution would work with the other configurations 310 or 320.

While the tile is the appropriate support for regions of interest, the slice segment is the entity that will be actually put into NAL units for transport on the network and aggregated to form an access unit (coded picture or sample at file format level). According to the HEVC standard, the type of NAL unit is specified in a NAL unit header. For NAL units of type "coded slice segment", the slice_segment_header indicates via the "slice_segment_address" syntax element the address of the first coding tree block in the slice segment. The tiling information is provided in a PPS (Picture Parameter Set) NAL unit. The relation between a slice segment and a tile can then be deduced from these parameters.

By definition, on tiles borders, the spatial predictions are reset. However, nothing prevents a tile from using temporal predictors from a different tile in the reference frame(s). In order to build independent tiles, at encoding time, the motion vectors for the prediction units inside a tile are constrained to remain in the co-located tile in the reference frame(s). In addition, the in-loop filters (deblocking and SAO) have to be deactivated on the tiles borders so that no error drift is introduced when decoding only one tile. This control of the in-loop filters is already available in the HEVC standard and is set in slice segment headers with the flag called "loop_filter_across_tiles_enabled_flag". By explicitly setting this flag to 0, the pixels at the tiles borders do not depend on the pixels that fall on the border of the neighbor tiles. When the two conditions on motion vectors and on in-loop filters are met, the tiles are said "independently decodable" or "independent".

When a video sequence is encoded as a set of independent tiles, it may be decoded using a tile-based decoding from one frame to another without risking missing reference data or propagation of reconstruction errors. This configuration makes it possible to reconstruct only a spatial part of the original video that corresponds, for example, to a region of interest.

In what follows, independent tiles are considered.

Figure 4:
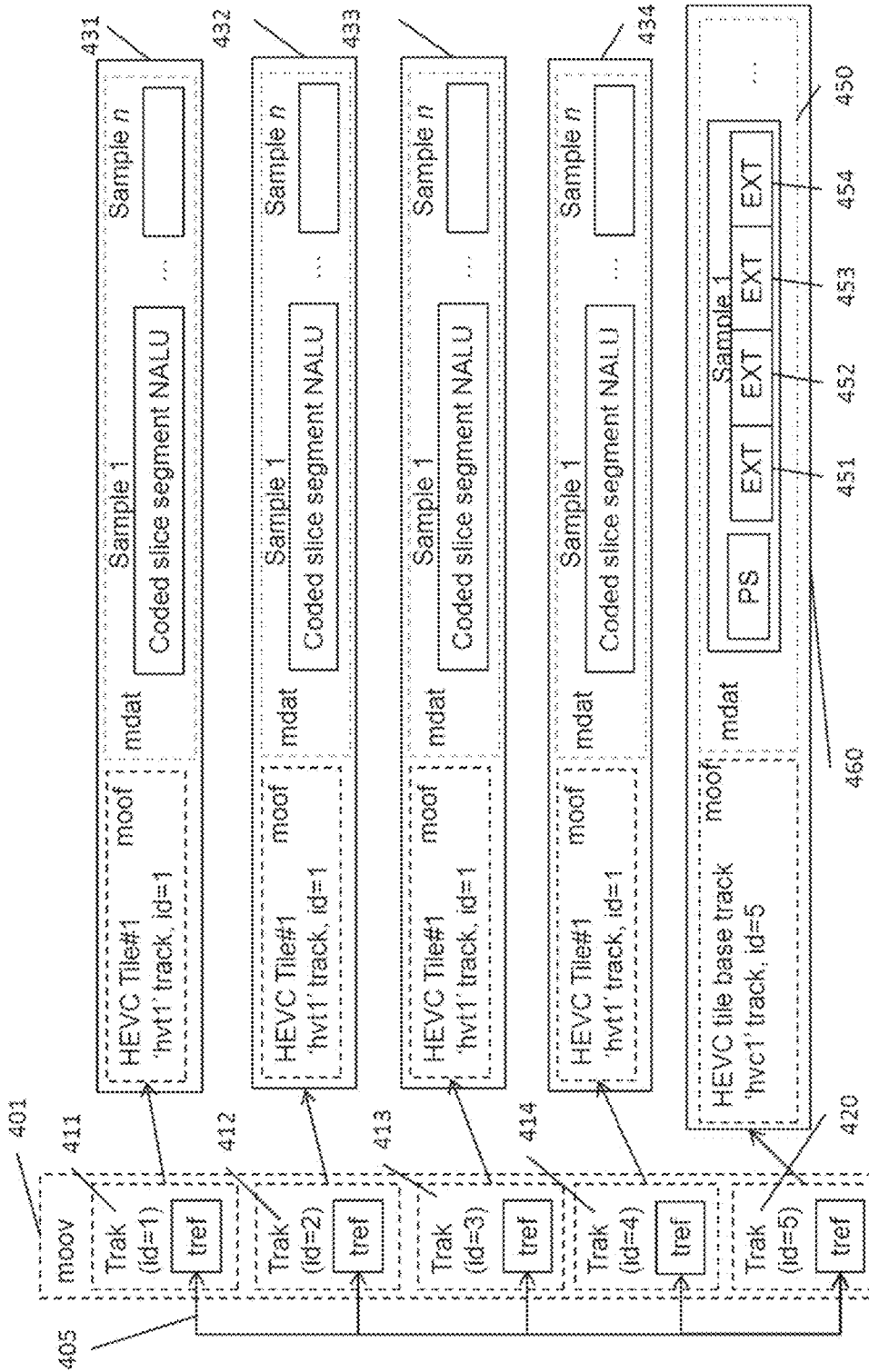
FIG. 4 illustrates the tile encapsulation according to the ISO Base Media File format with 'track' boxes.

With reference to FIG. 4, encapsulation of tiles into ISOBMFF file format is described. For example, each tile is encapsulated into a dedicated track. The setup and initialization information common to all tiles is encapsulated into a specific track, called for example the "tile base track". The full video is thus encapsulated as a composition of all these tracks, namely the tile base track and the set of tile tracks.

FIG. 4 illustrates an exemplary encapsulation. One way to encapsulate tiled video according to the ISOBMFF standard is to split each tile into a dedicated track, to encapsulate the setup and initialization information common to all tiles in a specific track, called for example the "tile base track" and to encapsulate the full video as a composition of all these tracks: tile base track plus a set of tile tracks. The encapsulation is thus referred to as "multi-track tile encapsulation". An example of multi-track tile encapsulation is provided in FIG. 4.

Box 401 represents the main ISOBMFF box 'moov' and contains the full list of tracks with their identifiers. For example, boxes 411 to 414 represent tile tracks (four tiles in the present example) and box 420 represents the tile base track. Additional tracks such as audio or text tracks may be used and encapsulated in the same file. However, for the sake of conciseness such additional tracks are not discussed here.

As represented in FIG. 4, the tile data is split into independent and addressable tracks so that any combination of tile track(s) can easily be reconstructed from the tile base track referencing the tile tracks for decoding and display. The tile base track may also be referred to as the "composite track" or "reference track" since it is designed to allow combination of any tiles: one, many or all tiles. The tile base track 420 contains common information to all the tile tracks and a list of samples 450 (only the first one is represented in FIG. 4) in a "mdat" box. Each sample 450 of the tile base track 420 is built by reference to each tile track through the use of extractors (451 to 454 each one representing one extractor to each tile). Each tile track 411 to 414 represents a spatial part of the whole, or full-frame, video. The tile description (position, size, bandwidth etc.) is stored in the track header boxes (not represented) of each tile track 411 to 414. The tile base track and each tile track are cross-referenced (405) using a box "TrackReferenceBox" in each track. Each tile track 411 to 414 refers to the tile base track 420 as the 'tbas' track ('tbas' is a specific code indicating a coding dependency from each tile track to the tile base track, in particular where to find the parameter "HEVCDecoderConfigurationRecord" that makes it possible to setup the video decoder that will process the elementary stream resulting from the file format parsing). Conversely, in order to enable full-video reconstruction, the tile base track 420 indicates a dependency of type 'scal' to each tile track (405). This is to indicate the coding dependency and to reflect the sample 450 definition of the tile base track as extractors to the tile tracks data. These extractors are specific extractors that, at parsing time, can support the absence of data. In FIG. 4, in order to provide a streamable version of the file, each track is decomposed into media segments (431 to 434 for the tile tracks and 460 for the tile base track). Each media segment comprises one or more movie fragments, indicated by the 'moof' box plus data. For tile tracks, the data part corresponds to a spatial sub-part of the video while for the tile base track, it contains the parameter sets, SEI messages when present and the list of extractors. The "moov" box 401 in case of streaming application would fit in an initialization segment. FIG. 4 illustrates only one segment but the tracks can be decomposed into any number of segments, the constraint being that segments for tile tracks and for tile base track follow the same temporal decomposition (i.e. they are temporally aligned), this is to make switching possible from full-video to a tile or a set of tiles. The granularity of this temporal decomposition is not described here, for the sake of conciseness.

The file format has descriptive metadata (such as "VisualSampleGroupEntries" for instance, or track reference types in 'tref' boxes) that describe the relationships between the tracks so that the data corresponding to one tile, a combination of tiles or all the tiles can easily be identified by parsing descriptive metadata.

In what follows, still images are described at the same level. Thus, upon user selection of any tiles, combination of tiles or all tiles of a picture, identification and extraction is facilitated. In case the pictures are mixed with video data, the description comes in parallel to the descriptive metadata for the video. Thus, for the same data set, an additional indexation layer is provided for the pictures (in addition to the indexation layers for the video and for the audio).

In still image file formats using 'meta' boxes, the pictures with the related information are described as information items. As illustrated in FIG. 5, the information items are listed in a dedicated sub-box "ItemInfoBox" 500 of the 'meta' box. This sub-box provides the number of information items present in the file. The sub-box also provides for each item, descriptive metadata represented as "ItemInfoEntry" 501. Several versions 502 (0, 1, 2) of this box exist according to the ISO BMFF standard evolution.

"Meta" items may not be stored contiguously in a file. Also, there is no particular restriction concerning the interleaving of the item data. Thus, two items in a same file may share one or several blocks of data. This is particularly useful for HEVC tiles (tiles can be stored contiguously or not), since it can make it straightforward to have one item per independently decodable tile. This item indicates the data offset in the main HEVC picture and length of the slice(s) used for the tile through an ItemLocationBox.

According to embodiments, a new item type for describing a tile picture may be added, named for example: "hvct" or 'tile' or reused from ISO/IEC 14496-15: 'hvt1'. Each item representing the tile picture (whatever the four character code chosen) may have a reference of type "tbas" to the 'hvc1' item from which it is extracted. Each item has an identifier "item_ID" 503 and is further described in a box "ItemLocationBox" in terms of byte position and size in the media data box containing the compressed data for the pictures.

Such syntax makes it possible for a file format reader (or "parser"), to determine, via the list of information items, how many information items are available with information concerning their type 504, for example 'tile' to indicate an information item is a tile picture of a full picture.

Thus, it is made possible to select a subset of information items in the file, a combination thereof, or the full set of information items in order to download only one tile of the image and the associated decoder configuration, while skipping the other tiles.

For cases where an HEVC tile depends on another HEVC tile for decoding, the dependency shall be indicated by an item reference of type 'dpnd' (or any specific four character code that indicates coding dependencies) as described in document w14123, WD of ISO/IEC 14496-15:2013 AMD 1, "Enhanced carriage of HEVC and support of MVC with depth information", MPEG 107 San Jose January 2014.

This document defines tools for associating HEVC tile NALUs with sample group descriptions indicating the spatial position of the tile (using the "TileRegionGroupEntry" descriptor). However, there is no direct equivalent of sample grouping for metadata information items which could allow reuse of these descriptors.

Therefore, according to embodiments, a tile description item is defined per tile and the tile is linked to its description using a modified version of the "ItemReferenceBox" box as explained below.

According to other embodiments, only one tiling description is provided, preferably in a generic way. Thus, the item list does not get too long.

The design may be as follows:
allow some items to describe a set of metadata, similar to sample groups but specific to each item type,
for any item, add the ability to describe one parameter for a given type of item reference. The parameter would then be interpreted depending on the type of the referred item (similar to grouping type).

Figure 6:
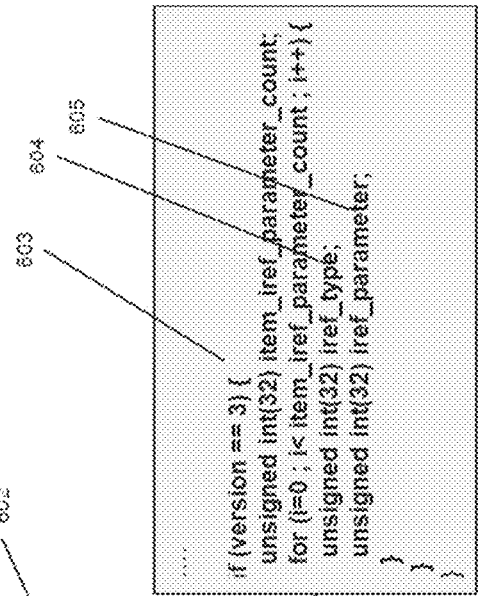
FIG. 6 illustrates an exemplary extension to the information item description.

An upgrade of the descriptive metadata for an information item may be needed as explained in what follows with reference to FIG. 6.

According to the ISOBMFF standard, the sample grouping mechanism is based on two main boxes having a "grouping_type" parameter as follows:
the box "SampleGroupDescriptionBox" has a parameter 'sgpd' that defines a list of properties (a list "SampleGroupEntry"),
the box "SampleToGroupBox" has a parameter 'sbgp' that defines a list of sample group with their mapping to a property.

The "grouping_type" parameter links a list of sample groups to a list of properties, the mapping of a sample group to one property in the list being specified in the box "SampleToGroupBox".

In order to provide the same functionality for the information items, a list of information items groups and a list of properties have to be described. Also, it should be made possible to map each group of information items to a property.

In what follows, there is described how to make possible such descriptive metadata to be embedded in the Still Image File Format. In other words, how to link a descriptor to an image item. Even if the use cases are described for the HEVC Still Image File Format, the following features may be used in other standards such as ISO/IEC 14496-12 for associating any kind of information item with additional descriptive metadata.

According to embodiments, the existing "ItemInformationEntry" box 601 with parameter 'infe' is extended with a new version number (602 and 603) in order to link each item to a property via a new parameter called "iref_type" 604 as shown in FIG. 6. This makes it possible to avoid the creation of new boxes and improves the description while keeping it short.

The original definition of ItemInformationEntry box is given by:

```
if (version == 2) {
    unsigned int(16) item_ID;
    unsigned int(16) item_protection_index;
    unsigned int(32) item_type;
    string item_name ;
    if (item_type=='mime') {
        string content_type;
        string content_encoding; //optional
    } else if (item_type == 'uri ') {
        string item_uri_type;
    }
}
```

A new version making linking a tile picture to its description may be as follows:

```
if ((version == 2) || (version == 3)) {
    unsigned int(16) item_ID;
    unsigned int(16) item_protection_index;
    unsigned int(32) item_type;
    string item_name;
    if (version == 2) {
        if (item_type=='mime') {
            string content_type;
```

```
            string content_encoding; //optional
        } else if (item_type == 'uri ') {
            string item_uri_type;
        }
    }
    if (version == 3) {
        unsigned int(32) item_iref_parameter_count;
        for (i=0 ; i< item_iref_parameter_count ; i++) {
            unsigned int(32) iref_type;
            unsigned int(32) iref_parameter;
        }
    }
}
```

According to other embodiments, closer to the box "SampleToGroupBox", the definition of the box "ItemInformationBox" with four character code 'iinf' is changed as follows, for example by introducing a new version of this box:
the current version:

```
aligned(8) class ItemInfoBox extends FullBox('iinf', version =
0, 0) {
    unsigned int(16) entry_count;
    ItemInfoEntry[ entry_count ] item_infos;
}
``` is changed into:

```
aligned(8) class ItemInfoBox extends FullBox ('iinf', version =
1, 0) {
    unsigned int(16)group_entry_count;
    for (int g=0; g< group_entry_count;g++){
        unsigned int(16) item_run;
        unsigned int(16) grouping_type;
        unsigned int(16) property_index;
        unsigned int(16) entry_count;
        ItemInfoEntry[ entry_count ] item_infos;
    }
    unsigned int(16) remaining_entry_count;
    ItemInfoEntry[remaining_entry_count ] item_infos;
}
```

Alternatively, in order to signal whether group is in use or not, the current version is changed into:

```
aligned(8) class ItemInfoBox extends FullBox('iinf', version =
1, 0) {
    unsigned int(1)group_is_used;
    if (group_is_used == 0){ // standard iinf box but with 1
additional byte overhead
        unsigned int(7)reserved; // for byte alignment
        unsigned int(16) entry_count;
        ItemInfoEntry[ entry_count ] item_infos;
    } else {
        unsigned int(15)group_entry_count;
        for (int g=0; g< group_entry_count;g++){
            unsigned int(16) item_run;
            unsigned int(16) grouping_type;
            unsigned int(16) property_index;
            unsigned int(16) entry_count;
            ItemInfoEntry[ entry_count ] item infos;
        }
        unsigned int(16) remaining_entry_count;
        ItemInfoEntry[remaining_entry_count ] item_infos;
    }
}
```

The "group_entry_count" parameter defines the number of information items groups in the media file. For each group of information item, a number of information items is indicated, starting from item_ID=0. Since information items have no time constraints and relationships, contrary to the samples, the encapsulation module can assign the information item identifiers in any order. By assigning increasing identifiers numbers following the items group, the list of information group can be more efficiently represented using a parameter item_run identifying the runs of consecutive information items identifiers in a group.

Figure 7:
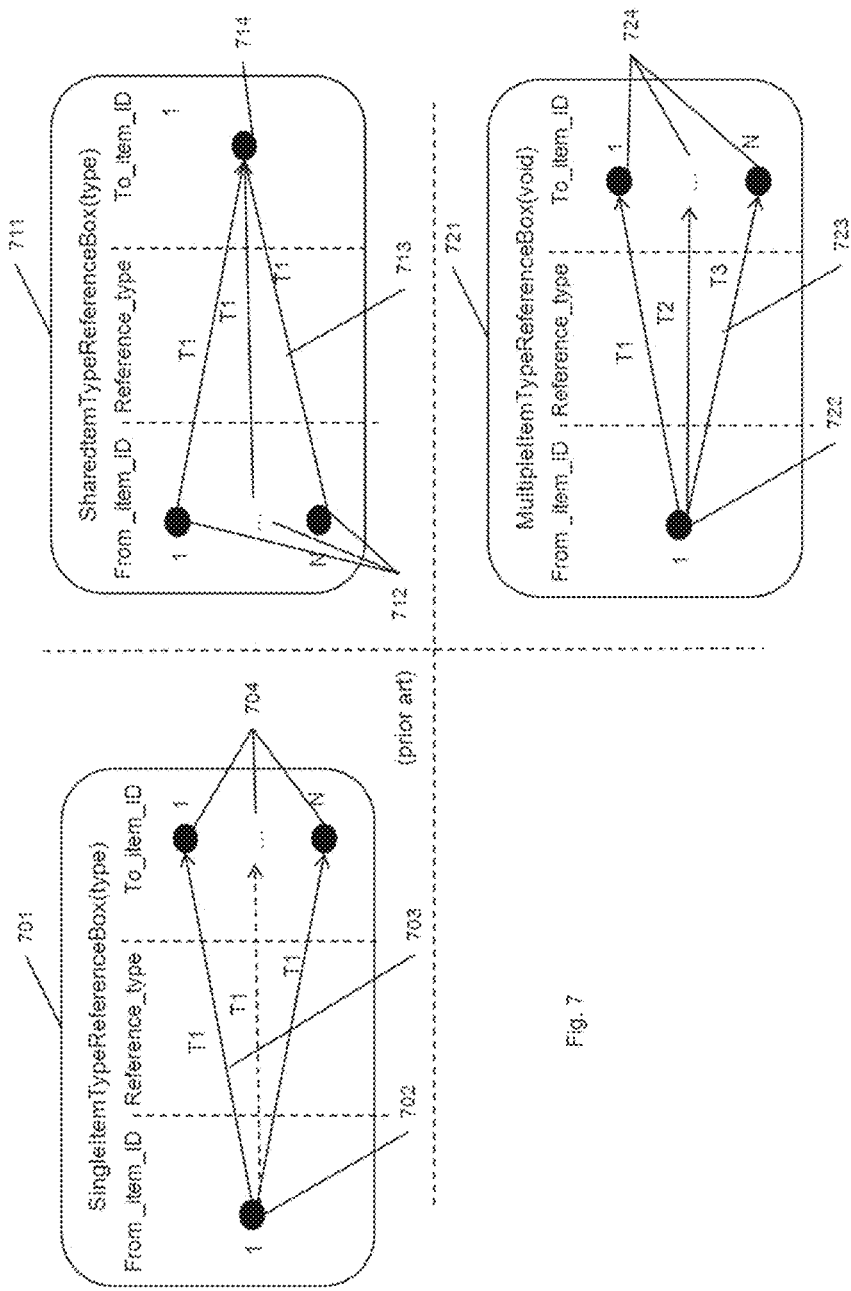
FIG. 7 illustrates the referencing mechanisms between information items.

The related information items have an index called for example "property_index". This "property_index" parameter associated with the "grouping_type" parameter enables a file format parser (or "reader") to identify either a reference to descriptive metadata or the descriptive metadata itself. FIG. 7 illustrates two exemplary embodiments.

The group feature in box "SingleItemTypeReferenceBox" 701 may be used with a group identification "group_ID" instead of the information item identification (item_ID) that is usually used for the value of the from_item_ID parameter. By design, thebox "SingleItemTypeReferenceBox" makes it easier to find all the references of a specific kind or from a specific item. Using it with a "group_ID" instead of "item_ID" makes it possible to find for a group of items to easily identify all the references of a specific type. Advantageously, since there is at most one box "ItemInformationBox" per encapsulated file, there is no need to define group identifications. An encapsulation module able to implement a method of encapsulating data according to the invention (during encoding) and a parsing module able to implement an method of processing an encapsulated data file according to the invention (during decoding) can run a respective counter (as the "g" variable in the box "ItemInformationBox) on the list of information item groups as they are created or read. Alternatively, the parser may be informed, using the flag "group_used_flag", whether to maintain or not the group identification counter.

Back to the example with one group of information items corresponding to the tile pictures, one group may contain four entries and the reference 700 "SingleItemTypeReference" may indicate the list of information items 704 on which the four tile picture information items depend, and so for a particular reference type 703.

According to other exemplary embodiments, the information item is used in a new kind of box "ItemReferenceBox", as described hereinafter, that makes it possible, from one item 722, to list multiple reference types 723 to various other information items 724.

For the latter case, the specific box "ItemReferenceBox" 721 may be implemented as follows:

```
aligned(8) class MultipleItemTypeReferenceBox(void) extends
Box(void) {
    unsigned int(16) from_item_ID;
    unsigned int(16) reference_count;
    for (j=0; j<reference_count; j++) {
        unsigned int(32) reference_type; // new parameter to allow
multiple types
        unsigned int(16) to_item_ID;
    }
}
```

As for the standard box "ItemInformationBox", the list of item entries is described, but this time with a different order depending on the grouping. In the tile example, this may lead to a first group of four information items corresponding to the tile pictures gathered in a group with a parameter that may be named 'tile' followed by non-grouped information items for the configuration information, for the full picture information item and optionally for the EXIF metadata.

Thus, one box is modified and one box is created that is a specific kind of ItemReferenceBox. In what follows, this new kind of ItemReferenceBox is described.

The box "ItemReferenceBox" may also be extended by distinguishing between the various kinds of ItemReferenceBox by using the flag parameters in the box "FullBox" which is part of the ItemReferenceBox as follows:

```
aligned(8) class ItemReferenceBox extends FullBox('iref', 0,
flags) {
switch (flags) {
case 0:
    SingleItemTypeReferenceBox references[ ];
    break;
case 1:
    MultipleItemTypeReferenceBox references[ ];
    break;
case 2:
    SharedItemTypeReferenceBox references[ ];
    break;
}
}
```

Using the box "MultipleItemTypeReferenceBox" 721, one picture with four tiles may be described as follows:
Item Reference Box (version=1 or flags=1):
fromID=2, ref_count=1, type='cdsc', toID=1;
fromID=1, ref_count=1, type='init', toID=3;
fromID=4, ref_count=2, type='tbas', toID=1, type='tile' toID=8;
fromID=5, ref_count=2, type='tbas', toID=1, type='tile' toID=8;
fromID=6, ref_count=2, type='tbas', toID=1, type='tile' toID=8;
fromID=7, ref_count=2, type='tbas', toID=1, type='tile' toID=8;

This design makes it fairly easier to find all the references of any kinds from a specific item.

Description support 711 for a list of items 712 referencing a same item 714 with a given type 713 may be as follows:

```
aligned(8) class SharedItemTypeReferenceBox(ref_type) extends
Box(referenceType) {
    unsigned int(16) reference_count;
    for (j=0; j<reference_count; j++) {
        unsigned int(16) from_item_ID;
    }
    unsigned int(16) to_item_ID;
    }
}
```

In the example of a picture with four tiles, then we may have:
type='cdsc', ref_count=1, fromID=2, toID=1;
type='init', ref_count=1, fromID=1, toID=3;
type='tbas', ref_count=4, fromID=4, fromID=5, fromID=6, fromID=7, toID=1;
type='tile', ref_count=4, fromID=4, fromID=5, fromID=6, fromID=7, toID=8;

The design of the box "SharedItemTypeReferenceBox" makes it easier to find all the references of a specific type pointing to a specific item. This is in contrast with box "SingleItemTypeReferenceBox". But since most of the "reference_type" defined for track references are not bi-directional, the box "SingleItemTypeReferenceBox" may not be used with some unidirectional reference type to signal all nodes having this reference type to other items. Alternatively, a flag may be provided in the "SingleItemTypeReference" for indicating whether it is a direct reference or a reverse reference, thereby alleviating the need for the new SharedItemTypeReferenceBox.

In view of the above, an information item can be associated with tiling information. A description of this tiling information has now to be provided.

For example, each tile may be described using a tile descriptor, such as the "iref_parameter" 605 of the extended "ItemInfoEntry" 601. A specific descriptor may be as follows:

```
aligned(8) class TileInfoDataBlock( ) {
    unsigned int(8) version;
    unsigned int(32) reference_width; // full image sizes
    unsigned int(32) reference_height;
    unsigned int(32) horizontal_offset; // tile positions
    unsigned int(32) vertical_offset;
    unsigned int(32) region_width; // tile sizes
    unsigned int(32) region_height;
}
```

According to embodiments, a descriptor may be used for the grid of tiles to apply to the one or more pictures to be stored.

Such descriptor may be as follows:

```
aligned(8) class TileInfoDataItem ( ) {
    unsigned int(8) version;
    unsigned int(1) regular_spacing; // regular grid or not
    unsigned int(7) reserved = 0;
    unsigned int(32) reference_width; // full-frame sizes
    unsigned int(32) reference_height;
    unsigned int(32) nb_cell_horiz;
    unsigned int(32) nb_cell_vert;
    if (!regular_spacing) {
        for (i=0; i<nb_cell_width; i++)
            unsigned int(16) cell_width;
        for (i=0; i<nb_cell_height; i++)
            unsigned int(16) cell_height;
    }
}
```

This descriptor "TileInfoDataItem" allows describing a tiling grid (regular or irregular). The grid is described rows by rows starting from top-left.

The descriptor shall be stored as an item of type 'tile'. When another item refers to this item, it shall use a reference of type "tile" to this description and it shall have a parameter "iref_parameter" specified, whose value is the 0-based index of the cell in the grid defined by the descriptor, where 0 is the top-left item, 1 is the cell immediately to the right of cell 0 and so on.

In the descriptor:
"version" indicates the version of the syntax for the TileInfoDataItem. Only value 0 is defined.
"regular_spacing" indicates if all tiles in the grid have the same width and the same height.
"reference_width, reference_height" indicates the units in which the grid is described. These units may or may not match the pixel resolution of the image which refers to this item. If the grid is regular, the "reference_width" (resp. "reference_height") shall be a multiple of "nb_cell_horiz" (resp. "nb_cell_vert").
"cell_width" gives the horizontal division of the grid in non-regular tiles, starting from the left.

"cell_height" gives the vertical division of the grid in non-regular tiles, starting from the top.

The above approach makes it possible to share the tiling information for all tiles.

Moreover, in case there are multiple pictures sharing the same tiling, even more description may be shared by simply referencing a cell in the grid of tiles.

The tiling configuration can be put in the media data box or in a dedicated box shared (by reference) among the tile information items.

The above descriptors are pure spatial descriptors in the sense that they only provide spatial locations and sizes for sub-image(s) in a greater image. In some use cases, for example with image collections or image composition, a spatial location is not enough to describe the image, typically when images overlap. This is one limitation of the TileInfoDataBlock descriptor above. In order to allow image composition, whatever the image i.e. a tile or an independent/complete image, it may be useful to define a descriptor that contains on the one hand the positions and sizes of the image (spatial relations) and on the other hand display information (color, cropping . . . ) for that picture. For example, color information can be provided to transform a sub-image from a color space to another one for display. This kind of information can be conveyed in the ColorInformationBox 'colr' of the ISOBMFF. It can be useful, for capacity, to have the same data prepared for different kinds of display just by providing the transformation parameters to apply rather than conveying the two different so-transformed pictures. As well, the pixel aspect ratio like PixelAspectRatio box 'pasp' defined in the ISOBMFF Part-12 can be put in this descriptor to redefine a width and height that can be different than the encoded width and height of each picture. This would indicate the scale ratio to apply by the display after the decoding of an image. We would then have the coded sizes stored in the video sample entries ('stsd' box for example) and the display sizes deduced from the 'pasp' box. Another possible information for display could be the clean aperture information box 'clap' also defined in ISOBMFF. According to standard SMPTE 274M, the clean aperture defines an area within which picture information is subjectively uncontaminated by all edge transient distortions (possible ringing effects at the borders of images after analog to digital conversions). This list of parameters useful for display is not limitative and we could put as optional components in the sub-image descriptor any other descriptive metadata box. These ones can be explicitly mentioned because they are already part of the standard and they provide generic tools to indicate image cropping, sample aspect ratio modification and color adjustments. Unfortunately their use was only possible for media tracks, not for image file format relying on 'meta' boxes. We then suggest a new descriptor called for example "SimpleImageMetaData" to support spatial description of image items, along with other properties such as clean aperture or sample aspect ratio or any other display parameters. This applies to any sub-image (tile or independent image) intended to be composed in a bigger image or at the reverse extracted from a bigger image:

```
aligned(8) class SimpleImageMetaData {
    CleanApertureBox clap; // optional
    PixelAspectRatioBox pasp; // optional
    ColourInformationBox colour; // optional
    ImageSpatialRelationBox location; // optional
}
```

Or its variation when considering extension parameters to help the display process (through for example extra_boxes):

```
aligned(8) class SimpleImageMetaData {
    CleanApertureBox    clap; // optional
    PixelAspectRatioBox pasp; // optional
    ColourInformationBox colour; // optional
    ImageSpatialRelationBox location; // optional
    extra_boxes             boxes; // optional
}
```

Where the ImageSpatialRelationBox is an extension of the TileInfoDataBlock as described in the following. Another useful parameter to consider is the possibility to compose images as layers. We then suggest inserting a parameter to indicate the level associated to an image in this layered composition. This is typically useful when images overlap. This can be called 'layer' for example with layer information indication. An example syntax for such descriptor is provided:

```
Definition:
Box Type: 'isre'
Container: Simple image meta-data item ('simd')
Mandatory: No
Quantity: Zero or one per item
Syntax:
aligned(8) class ImageSpatialRelationBox
extends FullBox ('isre, version = 0, 0) {
    unsigned int(32) horizontal_display_offset;
    unsigned int(32) vertical_display_offset;
    unsigned int(32) display_width;
    unsigned int(32) display_height;
    int(16) layer;
}
``` with the associated semantics:

horizontal_display_offset specifies the horizontal offset of the image.

vertical_display_offset specifies the vertical offset of the image.

display_width specifies the width of the image.

display_height specifies the height of the image.

layer specifies the front-to-back ordering of the image; images with lower numbers are closer to the viewer. 0 is the normal value, and −1 would be in front of layer 0, and so on This new 'isre' box type gives the ability to describe the relative position of an image with other images in an image collection. It provides a subset of the functionalities of the transformation matrix usually found in the movie or track header box of a media file. Coordinates in the ImageSpatialRelationBox are expressed on a square grid giving the author's intended display size of the collection; these units may or may not match the coded size of the image. The intended display size is defined by:

Horizontally: the maximum value of (horizontal_display_offset+display_width) for all 'isre' boxes Vertically: the maximum value of (vertical_display_offset+display_height) for all 'isre' boxes When some images do not have any 'isre' associated while other images in the file have 'isre' associated, the default images without any 'isre' shall be treated as if their horizontal and vertical offsets are 0, their display size is the intended display size and their layer is 0.

The ImageSpatialRelationBox indicates the relative spatial position of images after any cropping or sample aspect ratio has been applied to the images. This means, when 'isre' is combined with 'pasp', etc in a SimpleImageMetaData, the image is decoded, the 'pasp', 'clap', 'colr' are applied if present and then the image is moved and scaled to the offset and size declared in the 'isre' box.

This new descriptor can be used as description of an image (tile or single image) by defining an association between the item information representing the image and the item information representing the descriptor (let's give the type 'simd' for SimpleImageMetadata Definition, any reserved 4 character code would be acceptable for a mp4 parser to easily identify the kind of metadata it is currently processing). This association is done with an ItemReferenceBox and with a new reference type; 'simr' to indicate "spatial image relation". The example description below illustrates the case of a composition of 4 images where the composition itself has no associated item. Each image item is associated to a SimpleImageMetaData item through an item reference of type 'simr' and shares the DecoderConfigurationRecord information in a dedicated 'hvcC' item.

ftyp box: major-brand='hevc', compatible-brands='hevc'
meta box: (container)
    handler box: hdlr='hvc1' // no primary item provided
    Item Information Entries:
item_type='hvc1', itemID=1, item_protection_index=0
item_type='hvc1', itemID=2, item_protection_index=0
item_type='hvc1', itemID=3, item_protection_index=0
item_type='hvc1', itemID=4, item_protection_index=0
item_type='simd' itemID=5 (sub-image descriptor)
item_type='simd' itemID=6 (sub-image descriptor)
item_type='simd' itemID=7 (sub-image descriptor)
item_type='simd' itemID=8 (sub-image descriptor)
item_type='hvcC', item_ID=9, item_protection_index=0 . . .
    Item Reference:
type='simr' fromID=1, toID=5
type='simr' fromID=2, toID=6
type='simr' fromID=3, toID=7
type='simr' fromID=4, toID=8
type='init', fromID=1, toID=9;
type='init', fromID=3, toID=9;
type='init', fromID=4, toID=9;
type='init', fromID=5, toID=9;
    Item Location:
itemID=1, extent_count=1, extent_offset=P1, extent_length=L1;
itemID=2, extent_count=1, extent_offset=P2, extent_length=L2;
itemID=3, extent_count=1, extent_offset=P3, extent_length=L3;
itemID=4, extent_count=1, extent_offset=P4, extent_length=L4;
itemID=5, extent_count=1, extent_offset=P5, extent_length=L5;
itemID=6, extent_count=1, extent_offset=P6, extent_length=L6;
itemID=7, extent_count=1, extent_offset=P7, extent_length=L7;
itemID=8, extent_count=1, extent_offset=P8, extent_length=L8;
itemID=9, extent_count=1, extent_offset=P0, extent_length=L0;
    Media Data Box:
    1 HEVC Decoder Configuration Record ('hvcC' at offset P0)
    4 HEVC Images (at file offsets P1, P2, P3, P4)
    4 simple image metadata (at file offsets P5, P6, P7, P8)

The above organization of data is provided as an example: image and metadata could be interlaced in the media data box for example to have an image plus its metadata addressable as a single byte range. When receiving this description, a parser is informed, by parsing the information in the 'simd' items whether a sub-image is cropped from a full picture, or conversely if a full picture is a composition from sub-images. In case of crop, the full picture item and the cropped image would share the same data range as in example below and the same decoder configuration information. The sub-image would then then be associated to a 'simd' item having only 'clap' information and no positioning, then no 'isre' In case of composition: in such case, the full picture item is associated to a 'simd' item that only contains 'isre' information and the sub-image would be associated to a 'simd' item reflecting its position in the full image.

The example below illustrates the case where 4 images are composed into a larger one. All images, including the composed one are exposed as a playable item using the proposed descriptor.

ftyp box: major-brand='hevc', compatible-brands='mif1'
meta box: (container)
    handler box: hdlr='hevc' primary item box:
item_ID=1;
    Item Information Entries:
item_type='hvc1', itemID=1, item_protection_index=0 . . . // full-image
item_type='hvc1', itemID=2, item_protection_index=0 . . . // sub-image
item_type='hvc1', itemID=3, item_protection_index=0 . . . // sub-image
item_type='hvc1', itemID=4, item_protection_index=0 . . . // sub-image
item_type='hvc1', itemID=5, item_protection_index=0 . . . // sub-image
item_type='simd' itemID=6 (sub-image descriptor) . . .
item_type='simd' itemID=7 (sub-image descriptor) . . .
item_type='simd' itemID=8 (sub-image descriptor) . . .
item_type='simd' itemID=9 (sub-image descriptor) . . .
item_type='hvcC', item_ID=10 (decoder config record)
item_type='simd', item_ID=11 (sub-image descriptor)
    Item Reference Entries:
type='simr', fromID=1, toID=11
type='simr', fromID=2, toID=6
type='simr', fromID=3, toID=7
type='simr', fromID=4, toID=8
type='simr', fromID=5, toID=9
type='init', fromID=1, toID=10 . . .
type='init', fromID=2, toID=10 . . .
type='init', fromID=3, toID=10 . . .
type='init', fromID=4, toID=10 . . .
type='init', fromID=5, toID=10 . . .
    Item Location:
itemID=1, extent_count=4, // full image is composed of 4 sub-images
extent_offset=P2, extent_length=L2;
extent_offset=P3, extent_length=L3;
extent_offset=P4, extent_length=L4;
extent_offset=P5, extent_length=L5;
itemID=2, extent_count=1, extent_offset=P2, extent_length=L2;
itemID=3, extent_count=1, extent_offset=P3, extent_length=L3;
itemID=4, extent_count=1, extent_offset=P4, extent_length=L4;
itemID=5, extent_count=1, extent_offset=P5, extent_length=L5;
itemID=6, extent_count=1, extent_offset=P6, extent_length=L6;
itemID=7, extent_count=1, extent_offset=P7, extent_length=L7;

itemID=8, extent_count=1, extent_offset=P8, extent_length=L8;
itemID=9, extent_count=1, extent_offset=P9, extent_length=L9;
itemID=10, extent_count=1, extent_offset=P0, extent_length=L0;
itemID=11, extent_count=1, extent_offset=P10, extent_length=L10;
   Media Data Box:
      1 HEVC Decoder Configuration Record ('hvcC' at offset P0)
      4 HEVC (sub) Images (at file offsets P2, P3, P4, P5)
      5 simple image metadata (at file offsets P6, P7, P8, P9, P10)

This other example illustrates the case where the full picture is actually a tiled HEVC picture (4 tiles):
ftyp box: major-brand='hevc', compatible-brands='mif1'
meta box: (container)
   handler box: hdlr='hevc' primary item box: item_ID=1;
   Item Information Entries:
item_type='hvc1', itemID=1, item_protection_index=0 . . . // full-image
item_type='hvt1', itemID=2, item_protection_index=0 . . . // sub-image
item_type='hvt1', itemID=3, item_protection_index=0 . . . // sub-image
item_type='hvt1', itemID=4, item_protection_index=0 . . . // sub-image
item_type='hvt1', itemID=5, item_protection_index=0 . . . // sub-image
item_type='simd' itemID=6 (sub-image descriptor) . . .
item_type='simd' itemID=7 (sub-image descriptor) . . .
item_type='simd' itemID=8 (sub-image descriptor) . . .
item_type='simd' itemID=9 (sub-image descriptor) . . .
item_type='hvcC', item_ID=10 (decoder config record)
   Item Reference Entries:
type='init', fromID=1, toID=10 . . .
// declare sub-images as tiles of the full image
type='tbas', fromID=2, toID=1 . . .
type='tbas', fromID=3, toID=1 . . .
type='tbas', fromID=4, toID=1 . . .
type='tbas', fromID=5, toID=1 . . .
// providing positions and sizes
type='simr', fromID=2, toID=6
type='simr', fromID=3, toID=7
type='simr', fromID=4, toID=8
type='simr', fromID=5, toID=9
   Item Location:
itemID=1, extent_count=4, // full image is composed of 4 tiles
   extent_offset=P2, extent_length=L2 . . . // data for tile 1
   extent_offset=P3, extent_length=L3 . . . // data for tile 2
   extent_offset=P4, extent_length=L4 . . . // data for tile 3
   extent_offset=P5, extent_length=L5 . . . // data for tile 4
itemID=2, extent_count=1, extent_offset=P2, extent_length=L2;
itemID=3, extent_count=1, extent_offset=P3, extent_length=L3;
itemID=4, extent_count=1, extent_offset=P4, extent_length=L4;
itemID=5, extent_count=1, extent_offset=P5, extent_length=L5;
itemID=6, extent_count=1, extent_offset=P6, extent_length=L6;
itemID=7, extent_count=1, extent_offset=P7, extent_length=L7;
itemID=8, extent_count=1, extent_offset=P8, extent_length=L8;
itemID=9, extent_count=1, extent_offset=P9, extent_length=L9;
itemID=10, extent_count=1, extent_offset=P0, extent_length=L0;
   Media Data Box:
      1 HEVC Decoder Configuration Record ('hvcC' at offset P0)
      1 HEVC Image (with 4 tiles at file offsets P2, P3, P4, P5)
      4 simple image metadata (at file offsets P6, P7, P8, P9)

Depending on use cases, it would be possible to have several image items sharing the same metadata, for example when the same cropping is to be applied to all images. It is also possible for an image item to have multiple 'simr' references to different SimpleImageMetaData, for example when cropping is shared among images but not spatial information.

An alternative embodiment to the new version of the ItemInfoEntry (as illustrated in FIG. 6) is to define more than one parameter (605) per information item entry and reference. In the embodiment of FIG. 6, the iref_parameter is a four bytes code that is useful in case of a tile index to refer to a cell in a tiling grid. But in order to have richer description and to be able to embed linked description inside the item info entry itself rather than with the data (in mdat box), the following extension can be useful:

```
if (version == 3) {
    unsigned int(32) item_iref_parameter_count;
    for (i=0 ; i< item_iref_parameter_count ; i++) {
        unsigned int(32) iref_type;
        ItemReferenceParameterEntry parameter;
    }
aligned(8) abstract class ItemReferenceParameterEntry (unsigned int(32) format)
    extends Box(format){
}
// Example to reference a tile index
aligned(8) abstract class TileIndexItemReferenceParameterEntry
    extends ItemReferenceParameterEntry('tile'){
        unsigned int(32) tile_index;
}
// Example to inline the tile description
aligned(8) abstract class TileIndexItemReferenceParameterEntry
    extends ItemReferenceParameterEntry('tile'){
        unsigned int(32) tile_index;
}
```

In the above extension:
item_iref_parameter_count gives the number of reference types for which a parameter is given. This is unchanged compared to item 605 in FIG. 6,
iref_type gives the reference type, as indicated in the 'iref' box, for which the parameter applies for this item. This is unchanged compared to item 605 in FIG. 6.
parameter here differs from iref_parameter (item 605 in FIG. 6) because it provides an extension means via the new box ItemReferenceParameterEntry. By specializing this new box (as done above with TileIndexItemReferenceParameterEntry for tile index in a tiling configuration), any kind of additional metadata can be associated with an information item entry provided that the encapsulation and the parsing modules are aware of the structure of this specialized box. This can be done by standard types of ItemReferenceParameterEntry or by providing by construction or in a negotiation step the structure of the parameter entry. The semantics of the parameter is given by the semantics of the item with type iref_type.

In what follows, there are provided exemplary descriptive metadata for information items describing a picture with 4 tiles and the EXIF meta data of the full picture.

In the prior art, the tile pictures were listed as information items without any corresponding description provided as show herein below. Moreover, the setup information denoted 'hvcC' type was not described as an item. This makes it possible to factorize the common data related to HEVC parameter sets and SEI messages that apply to all tile pictures and to the full picture.

ftyp box: major-brand='hevc', compatible-brands='hevc'
meta box: (container)
    handler box: hdlr='hvc1' primary item: itemID=1;
    Item Information:
item_type='hvc1', itemID=1, item_protection_index=0 (unused)=>Full pict.
item_type='Exif', itemID=2, item_protection_index=0 (unused)
item_type='hvcC', itemID=3, item_protection_index=0 (unused)
item_type='hvct', itemID=4, item_protection_index=0 (unused)=>Tile pict.
item_type='hvct', itemID=5, item_protection_index=0 (unused)=>Tile pict.
item_type='hvct', itemID=6, item_protection_index=0 (unused)=>Tile pict.
item_type='hvct', itemID=7, item_protection_index=0 (unused)=>Tile pict.
    Item Location:
itemID=1, extent_count=1, extent_offset=X, extent_length=Y;
itemID=2, extent_count=1, extent_offset=P, extent_length=Q;
itemID=3, extent_count=1, extent_offset=R, extent_length=S;
itemID=4, extent_count=1, extent_offset=X, extent_length=ET1;
itemID=5, extent_count=1, extent_offset=X+ET1, extent_length=ET2;
itemID=6, extent_count=1, extent_offset=X+ET2, extent_length=ET3;
itemID=7, extent_count=1, extent_offset=X+ET3, extent_length=ET4;
    Item Reference:
type='cdsc', fromID=2, toID=1;
type='init', fromID=1, toID=3;
type='tbas', fromID=4, toID=1;
type='tbas', fromID=5, toID=1;
type='tbas', fromID=6, toID=1;
type='tbas', fromID=7, toID=1;
Media Data Box:
    HEVC Image (at file offset X, with length Y)
    Exif data block (at file offset P, with length Q)
    HEVC Config Record (at file offset R, with length S)
// No Tile description According to embodiments, using the extension with version 3 (see FIG. 6, 602, 603) of ItemInfoEntry box (601): tile picture information is listed with associated references to parts of the tiling configuration that is also described as an information item (ID=8).

ftyp box: major-brand='hevc', compatible-brands='hevc'
meta box: (container)
    handler box: hdlr='hvc1' primary item: itemID=1;
    Item Information:
item_type='hvc1', itemID=1, item_protection_index=0 (unused)
item_type='Exif', itemID=2, item_protection_index=0 (unused)
item_type='hvcC', itemID=3, item_protection_index=0 (unused)
item_type='hvct', itemID=4, parameter for ireftype==tile: tile_index=0
item_type='hvct', itemID=5, parameter for ireftype==tile: tile_index=1
item_type='hvct', itemID=6, parameter for ireftype==tile: tile_index=2
item_type='hvct', itemID=7, parameter for ireftype==tile: tile_index=3
item_type='tile', itemID=8, (tiling configuration)
    Item Location:
itemID=1, extent_count=1, extent_offset=X, extent_length=Y;
itemID=2, extent_count=1, extent_offset=P, extent_length=Q;
itemID=3, extent_count=1, extent_offset=R, extent_length=S;
itemID=4, extent_count=1, extent_offset=X, extent_length=ET1;
itemID=5, extent_count=1, extent_offset=X+ET1, extent_length=ET2;
itemID=6, extent_count=1, extent_offset=X+ET2, extent_length=ET3;
itemID=7, extent_count=1, extent_offset=X+ET3, extent_length=ET4;
itemID=8, extent_count=1, extent_offset=1, extent_length=1;
    Item Reference:
type='cdsc', fromID=2, toID=1;
type='init', fromID=1, toID=3;
type='tbas', fromID=4, toID=1;
type='tbas', fromID=5, toID=1;
type='tbas', fromID=6, toID=1;
type='tbas', fromID=7, toID=1;
type='tile', fromID=4, toID=8; //
type='tile', fromID=5, toID=8; // link each tile pict.
type='tile', fromID=6, toID=8; // to the tiling config item
type='tile', fromID=7, toID=8; //
Media Data Box:
    HEVC Image (at file offset X, with length Y)
    Exif data block (at file offset P, with length Q)
    HEVC Config Record (at file offset R, with length S)
    Tile description data block (at file offset i, with length I)

Figure 8:
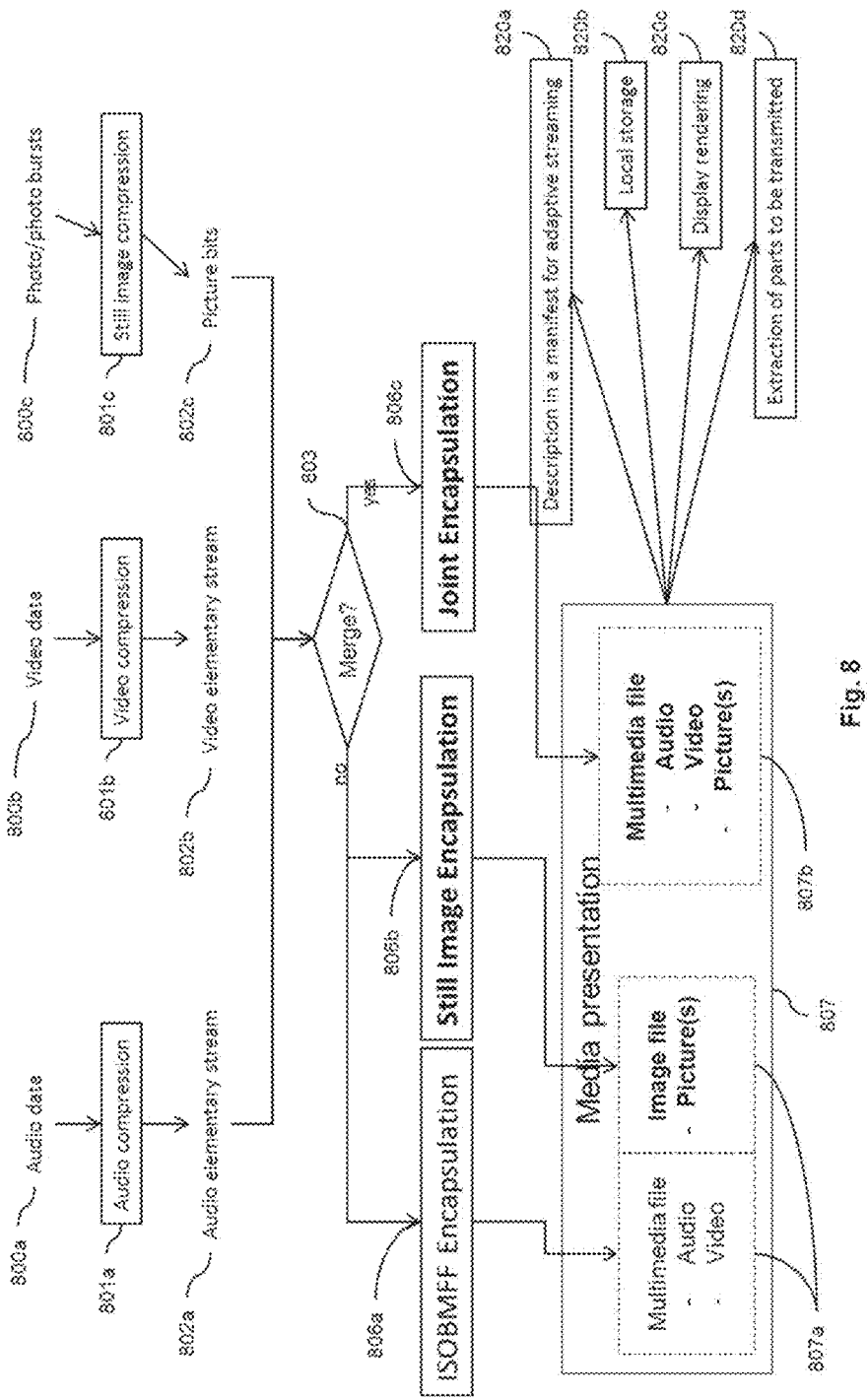
FIG. 8 illustrates a context of implementation of embodiments of the invention.

FIG. 8 illustrates a context of implementation of embodiments of the invention. First different media are recorded: for example audio during step 800a, video during step 800b and one or more pictures during step 800c. Each medium is compressed during respective steps 801a, 801b and 801c. During these compression steps elementary streams 802a, 802b and 802c are generated. Next, at application level (user selection from graphical user interface; configuration of the multimedia generation system etc.), an encapsulation mode is selected in order to determine whether or not all these elementary streams should be merged or not. When the "merge" mode is activated (test 803, "yes"), data for audio, video and still images are encapsulated in the same file during step 806c as described hereinabove. If the "merge" mode is not activated (test 803, "no"), then two encapsulated files are generated during steps 806a and 806b consecutively or in parallel thereby respectively leading to the creation of one file for synchronized time media data during step 807a and an additional file with only the still images 907b. During step 806a, audio and video elementary streams are encapsulated according to the ISOBMFF standard and the still pictures are encapsulated during step 806*b* as described herein above in order to provide tile description and region of interest features. Finally, a media presentation 807 is obtained and can be provided to a DASH generator to prepare it for streaming (step 820*a*) or stored into a memory (step 820*b*) or rendered on a display unit (step 820*c*) or transmitted (step 820*d*) to a remote entity either entirely or after some parts (such as tiles), have been extracted by parsing the descriptive metadata.

According to another embodiment, it is proposed a new 'hvco' item for allowing the composition of sub-image pictures, in particular sub-image pictures which belong to at least two different pictures.

In this case, the primary item is a composed image.

More specifically, based on the definition of the HEVC Still Image File Format, no simple solutions are provided when composing sub-image pictures, in particular when pictures come from different HEVC pictures having different decoder configuration information (shared by the dedicated 'hvcC' item).

One solution for composing sub-images picture is depicted in text above related to FIG. 7. The composite image is declared as an 'hvc1' item. This 'hvc1' item required an 'hvcC' item according to still image File Format.

But when the pictures where the sub-images come from are associated with different or incompatible decoder configuration information, there is no "hvcC" item which could correspond to the resulting HEVC composite image.

Figure 9:
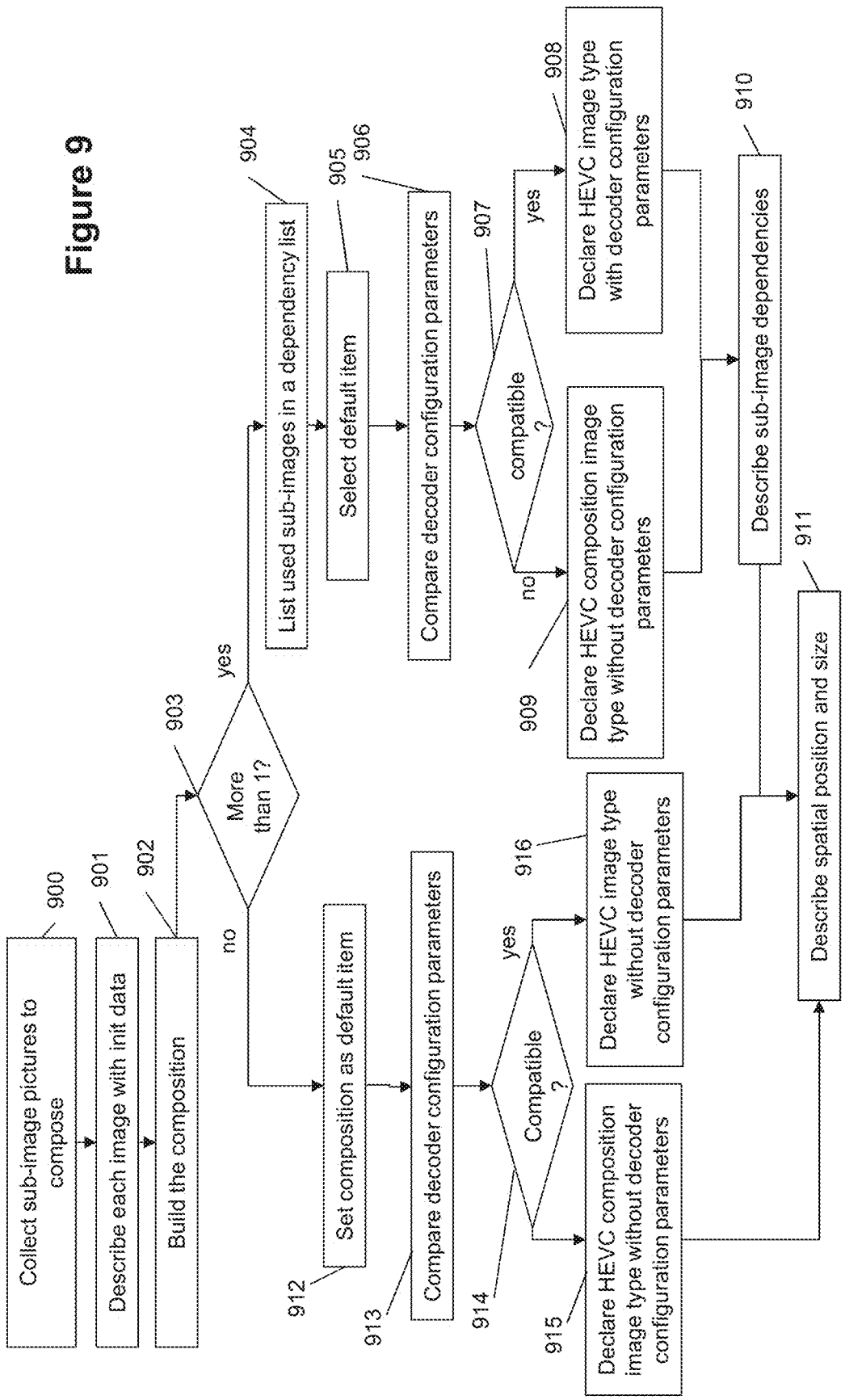
FIG. 9 illustrates an embodiment regarding a method of encapsulation, at server side.

A new solution illustrated in FIG. 9 is provided by the present invention.

During a first step 900, sub-image pictures to use in the composition (for example compressed with HEVC) are collected. During a step 901 each one is described as an HEVC image item using for instance a code as defined above, here named 'hvc1'.

Still during step 901, the decoder configuration information of each sub-image picture is described as an initialization item using for example the 'hvcC' item described above. Both sub-image picture item and initialization data are linked via an ItemReferenceBox described above with reference to FIG. 7. It has to be noted that each sub-image picture can have its own initialization data, i.e. one hvcC item per sub-image, or all sub-images can share the same initialization data as on the description example below. The latter occurs when sub-image pictures correspond to tiles from a same picture.

During a step 902 a composed picture is built, for example by a user through the user interface of an image manipulation tools. The user can bring parts of pictures together so as to create a composite picture (or composed picture) mixing spatial full or subparts of the sub-image pictures.

The respective position and sizes of the selected sub-parts are saved by the picture manipulation tool and provided to the server in charge of encapsulating the composite image in order to insert them in the encapsulation data file for terminating step 902. The image manipulation tool may comprise a Graphical User Interface for processing (cropping, resizing, filtering . . . ) an image. In case the user produced more than one composite picture (test 903), a list of dependencies between each composite picture and the used sub-image pictures is built during 904.

Then during a step 905, the composite picture defined by the user as the preferred image to display by default is described in dedicated file for example through a primary item box, already described above.

Then during a step 906, a comparison is drawn (by the encapsulation module) in order to compare the initialization data needed for each sub-image picture composing the composite picture (mainly decoder configuration information like profiles, levels, number of bits per pixels . . . ). These are checked to determine whether they are compatible or not. In order to help the comparison, a checksum for each parameter set can be generated at encapsulation of each sub-image and stored either with textual description in user metadata box linked to the sub-image item or in a modified version of the decoder configuration information, with the NAL units representing the various parameter sets of the image bitstream. The comparison when done a posteriori can be facilitated. This is the object of a test at step 907. Typically in HEVC Still Image File format, information related to initialization data are stored in a dedicated item with type 'hvcC' and reflects the properties of the HEVC bitstream. For example, the initialization data of two distinct sub-image pictures are considered as being compatible when the set of HEVC tools in use (profile, level . . . ) is the same, as well as the image data representation format (number of bits per pixel . . . ). If all the initialization data is compatible (908), then the composite picture can be linked to one of the initialization data item of a sub-image picture or to an initialization data item shared by all sub-image pictures (step 907).

As mentioned above, this can be done with an ItemReferenceBox and an 'init' reference type or any other means to indicate initialization data. Moreover the corresponding image item for the composite picture can be described as an HEVC item type, for example using the 'hvc1' code.

If the initialization data items are not compatible (909), then the composite picture has no initialization data associated. A specific signaling is required. For example an 'hvco' code or any reserved code to indicate an HEVC composition of sub-image pictures and the corresponding initialization data has to be retrieved from each sub-image picture used for composing the composite picture. At the end, since there could be many composite pictures, each composite picture may be linked to its corresponding list of sub-image pictures through an item reference box in 910. This consists in declaring for each composite picture the list of dependencies built during step 904 with an ItemReferenceBox of type 'base' (as defined in the draft for international standard for Still Image File Format w14642) or 'tile' (as described in previous embodiments) or any dedicated four character code (for compliance with file format) indicating that the composite picture is generated from or uses this list of sub-image pictures.

Finally in step 911, display offsets (for instance comprising vertical and horizontal positions of the top left corner of the image) and display sizes for the composite picture are described ('simd' code for example and descriptor for spatial relation like "SimpleImageMetaData" introduced in previous embodiments or like ISOBMFFMetaData (defined in w14642) or any equivalent descriptor for display parameters). The last description parameter is about data location in the bitstream, i.e. in the 'mdat' box. This can be provided for example with the ItemLocationBox. In case of composite picture, data location may simply consists in listing the data position of the sub-image pictures or when not present let the parser get these information from the list of dependent sub-image picture.

The same process goes when there is only one composite picture from 903 (false) to 912-917 except that there is no need to describe the dependency list, assuming that by default all the sub-image pictures having spatial relationship description (for example 'isre' with non null display sizes) are involved in the composition.

The description example below illustrates when a user would like to expose a composite picture as the primary item in a multimedia file for player to directly render this composite image. This example corresponds to the case where initialization data of the different sub-image pictures composing the composite picture are not compatible. Indeed the first two sub-image pictures share common initialization data (item 9) while the two other sub image pictures (items 3 and 4) share other initialization data (item 12). This may be the case when parameter sets for the image bitstream are embedded in the decoder configuration information. Then the composite picture is described as an 'hvco' item and also indicates the display size of the resulting composition in an item 11. The location of the data is here not described, deduced from the four sub-image pictures since only one composition is described in the encapsulated file.

ftyp box: major-brand='hevc', compatible-brands='mif1'
meta box: (container)
handler box: hdlr='hevc' primary_item box: item_ID=10
Item Information Entries:
item_type='hvc1', itemID=1 (sub-image)
item_type='hvc1', itemID=2 (sub-image)
item_type='hvc1', itemID=3 (sub-image)
item_type='hvc1', itemID=4 (sub-image)
item_type='simd' itemID=5 (sub-image 1 descriptor, same isre as in example 2)
item_type='simd' itemID=6 (sub-image 2 descriptor, same isre as in example 2)
item_type='simd' itemID=7 (sub-image 3 descriptor, same isre as in example 2)
item_type='simd' itemID=8 (sub-image 4 descriptor, same isre as in example 2)
item_type='hvcC', item_ID=9 (decoder config, shared among 2 sub-images)
item_type='hvco', itemID=10 (the composite image)
item_type='simd' itemID=11 (composite image, isre={0, 0, 640, 384, 0})
item_type='hvcC', item_ID=12 (decoder config, shared among 2 sub-images)
Item Reference:
type='simr' from_item_ID=1, to_item_ID=5
type='simr' from_item_ID=2, to_item_ID=6
type='simr' from_item_ID=3, to_item_ID=7
type='simr' from_item_ID=4, to_item_ID=8
type='init', from_item_ID=9, reference_count=2, to_item_ID=1, 2
type='init', from_item_ID=12, reference_count=2, to_item_ID=3, 4
type='simr' from_item_ID=10, to_item_ID=11
Item Location:
itemID=1, extent_count=1, extent_offset=P1, extent_length=L1;
itemID=2, extent_count=1, extent_offset=P2, extent_length=L2;
itemID=3, extent_count=1, extent_offset=P3, extent_length=L3;
itemID=4, extent_count=1, extent_offset=P4, extent_length=L4;
itemID=5, extent_count=1, extent_offset=P5, extent_length=L5;
itemID=6, extent_count=1, extent_offset=P6, extent_length=L6;
itemID=7, extent_count=1, extent_offset=P7, extent_length=L7;
itemID=8, extent_count=1, extent_offset=P8, extent_length=L8;
itemID=9, extent_count=1, extent_offset=P0, extent_length=L0;
Media Data Box:
1 HEVC Decoder Configuration Record ('hvcC' at offset P0)
4 HEVC Images (at file offsets P1, P2, P3, P4)
4 Simple Image Metadata items (at file offsets P5, P6, P7, P8)

Another example of description file below illustrates a composition where the sub images share the same hvcC item. This may happen when parameter sets for the image bitstream are not present in the decoder configuration information. In this case, in a preferred embodiment the composite image is declared with type 'hvco' plus a reference to the shared 'hvcC' item. The 'hvcC' item warns the player about profile, level, bit depth information. It also indicates that the composite picture is not really an HEVC picture (if HEVC standard is considered) by itself but rather several HEVC sub-images to be decoded and displayed together.

ftyp box: major-brand='hevc', compatible-brands='mif1'
meta box: (container)
handler box: hdlr='hevc' primary item box: item_ID=10
Item Information Entries:
item_type='hvc1', itemID=1 (sub-image)
item_type='hvc1', itemID=2 (sub-image)
item_type='hvc1', itemID=3 (sub-image)
item_type='hvc1', itemID=4 (sub-image)
item_type='simd' itemID=5 (sub-image 1 descriptor, same isre as in example 2)
item_type='simd' itemID=6 (sub-image 2 descriptor, same isre as in example 2)
item_type='simd' itemID=7 (sub-image 3 descriptor, same isre as in example 2)
item_type='simd' itemID=8 (sub-image 4 descriptor, same isre as in example 2)
item_type='hvcC', item_ID=9 (decoder config, shared among all sub-images)
item_type='hvco', itemID=10 (the composite image)
item_type='simd' itemID=11 (full image, isre={0, 0, 640, 384, 0}) // the referential for composition
Item Reference:
type='simr' from_item_ID=5, to_item_ID=1
type='simr' from_item_ID=6, to_item_ID=2
type='simr' from_item_ID=7, to_item_ID=3
type='simr' from_item_ID=8, to_item_ID=4
type='init', from_item_ID=9, reference_count=4, to_item_ID=3, 4, 5, 9, 10 (reverse order)
type='simr' from_item_ID=11, to_item_ID=10
Item Location:
itemID=1, extent_count=1, extent_offset=P1, extent_length=L1;
itemID=2, extent_count=1, extent_offset=P2, extent_length=L2;
itemID=3, extent_count=1, extent_offset=P3, extent_length=L3;
itemID=4, extent_count=1, extent_offset=P4, extent_length=L4;
itemID=5, extent_count=1, extent_offset=P5, extent_length=L5;
itemID=6, extent_count=1, extent_offset=P6, extent_length=L6;
itemID=7, extent_count=1, extent_offset=P7, extent_length=L7;
itemID=8, extent_count=1, extent_offset=P8, extent_length=L8;
itemID=9, extent_count=1, extent_offset=P0, extent_length=L0;

itemID=10, extent_count=4, // full composed from 4 sub-images extents P1, P2, P3, P4
Media Data Box:
1 HEVC Decoder Configuration Record ('hvcC' at offset P0)
4 HEVC Images (at file offsets P1, P2, P3, P4)
4 Simple Image Metadata items (at file offsets P5, P6, P7, P8)

In another embodiment, the information indicating that the primary item is a composite picture and not an HEVC picture, is preferably indicated it in the handler box or even as a specific brand so that the player immediately gets the information, without starting to parse the different items.

This description and new item type for composite picture item can also apply to tiles from a same image or from different images. Again, depending on the profile, level, tiling configuration in the different images, the composite picture cannot reuse the decoder configuration information from one or another sub-image picture thus requiring its own signalization having a specific type.

Another kind of picture item type can be useful to indicate that the primary item is a cropped version of an HEVC image. This can be signaled for example with the code: 'hvcr', for an HEVC Cropped Image either in the image item type or at higher level in the description file like the handler box or through a dedicated brand indicating that various HEVC profiles are in use. This can be useful when the resulting cropped image leads to a required decoder profile lower than the required profile to decode the original bigger image. The author of the presentation can optionally associate modified decoder configuration information reflecting the cropping operation to the cropped image item. For example, cropping from ultra high resolution to HD change the level information. With this specific signalization, a player will rapidly determine whether it can handle or not the cropped image item. However, when decoder configuration is different for the cropped image, the brand or the type given in the handler should reflect the highest profile and level in use in the file. In such case, players aware of hvcr code could check in the image information item whether one image can be displayed even if it does not support the highest profile and/or level in use.

Finally, according to an embodiment, the invention proposes a creation of a new item type for pictures resulting from a composition of several HEVC sub-images or tiles. For example, the new item type may be 'hvco' for HEVC Composition image. Such image, contrary to 'hvc1', does not require to be linked to a specific 'hvcC' item. Indeed a specific 'hvcC' item is not always available given that the sub-image pictures involved may come from different HEVC sub-images. In other words, the composite picture or still images may be defined by the fact that they are related to a primary still image and that they have also to be defined, for example using an item like 'hvco' Optionally, the composite picture item may be linked to an item 'simd' identifying the spatial relation of the composite picture and the sub-image pictures and other metadata descriptor. So a parser can easily have the display sizes of the composite picture (without having to parse all the 'simd' items related to the sub-images involved in the composition).

Optionally, when composition is done with sub-images sharing the same 'hvcC' information, the item for the composite image can also be linked to this same 'hvcC' item. The link to 'hvcC' item is not mandatory for images with 'hvco' image items.

Optionally, a composite picture can be linked to the sub-images through a 'tile' or 'base' reference image item, 'tile' indicating the referenced sub-image pictures are spatial parts of the composite picture and 'base' indicating that the composite picture is derived from the referenced sub-image pictures. Moreover, to improve readability and compactness of initialization data declarations, image items can be linked to an item of type 'hvcC' by an item reference of type 'init' from the 'hvcC' item to the list of image items using it. Items of type 'hvcC' may contain the HEVC decoder configuration record defined as structurally identical to the HEVC Decoder Configuration Record in ISO/IEC 14496-15.

Figure 10:
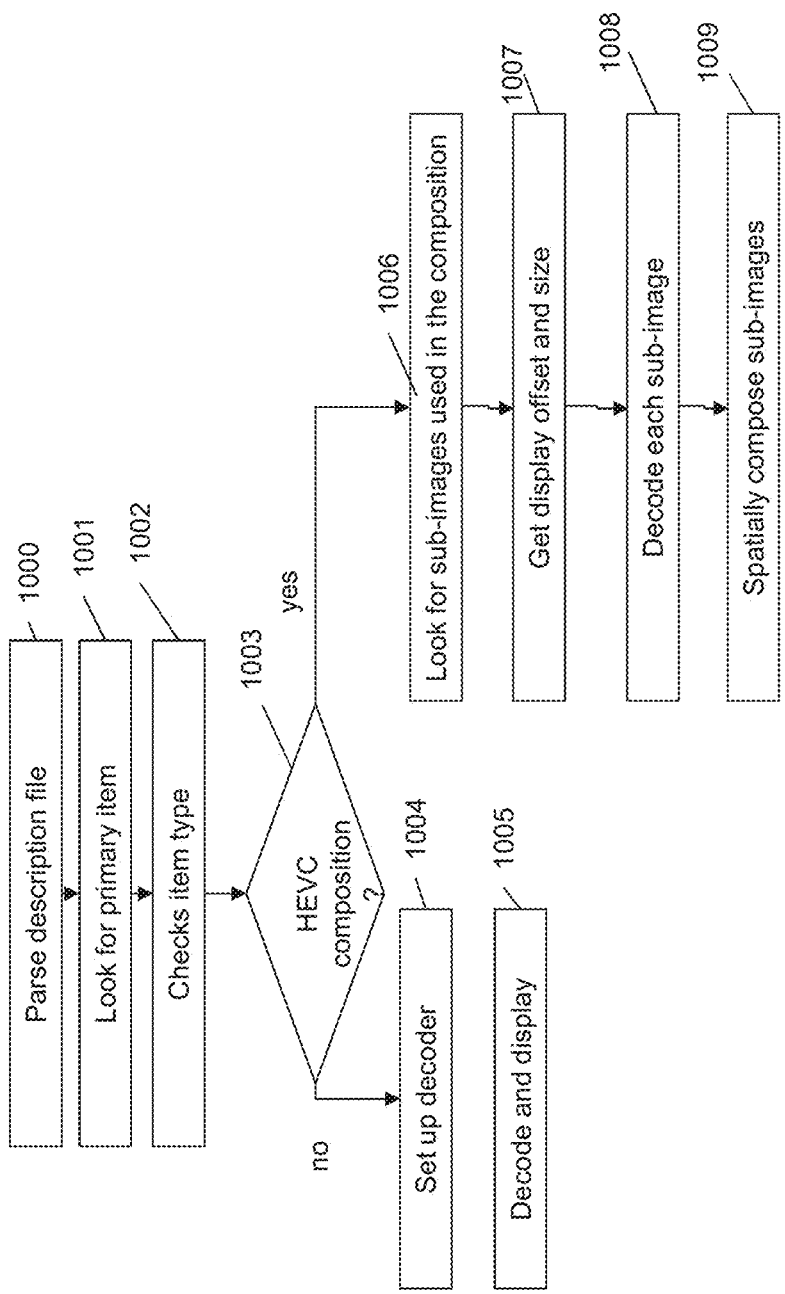
FIG. 10 illustrates an embodiment regarding a parsing method at client side.

FIG. 10 illustrates a multimedia client (typically a multimedia player) processing an encapsulated data file. Such a client should implement a parser, for example as a software module in charge of reading and interpreting the Still Image file format parameters.

During a step 1000 the client parses the multimedia file comprising the encapsulated data file, looking at the encapsulated metadata (typically the meta boxes in the Still Image File Format) describing the media data.

It checks in 1001 whether a primary item is declared to be displayed as the default image. Once the item identifier is retrieved, during step 1002, it is checked whether it is an HEVC image item or a composite HEVC item, by looking at its item type.

If it is an HEVC image, the client simply gets the initialization data to set up its decoder (1004) and retrieves the corresponding data provided to the HEVC decoder for rendering (1005).

In case of a composition image, the player checks whether all sub-image pictures are involved or only a subset: first by looking for a 'base' or 'tile' reference to the composite picture. If no reference is found the player collects the sub-image pictures being linked to a spatial relation descriptor (for example following a 'simr' reference type).

Then, the parser checks whether spatial relation information or display parameters are available for the composition picture or not. If present, it is read directly from the corresponding metadata item (for example having 'simd' item type), otherwise it is computed from the spatial relation descriptors or display parameters of the used sub-image pictures as the maximum value of their display_offsets and display_sizes.

This is the object of step 1007. The next step is to initialize the decoder. Since it is a HEVC composition picture, various types of content for the 'hvcC' code have to be considered. Depending on whether the player implements one or several HEVC decoders, it sequentially sets up and decodes each sub-image listed in 1005 or process them in parallel (1008). Each decoded picture is composed according to its spatial relation descriptor or display parameters (1009).

Then, the display "screen" (meaning the area where to display the decoded picture) can be set up with display size information. If the multimedia client provides an image manipulation tool, it can be used to generate a new composite picture with the available picture items. Then, following the steps described with respect to FIG. 9, client implementing the invention can generate a modified version of the multimedia file including the so-generated composite picture(s).

Figure 11:
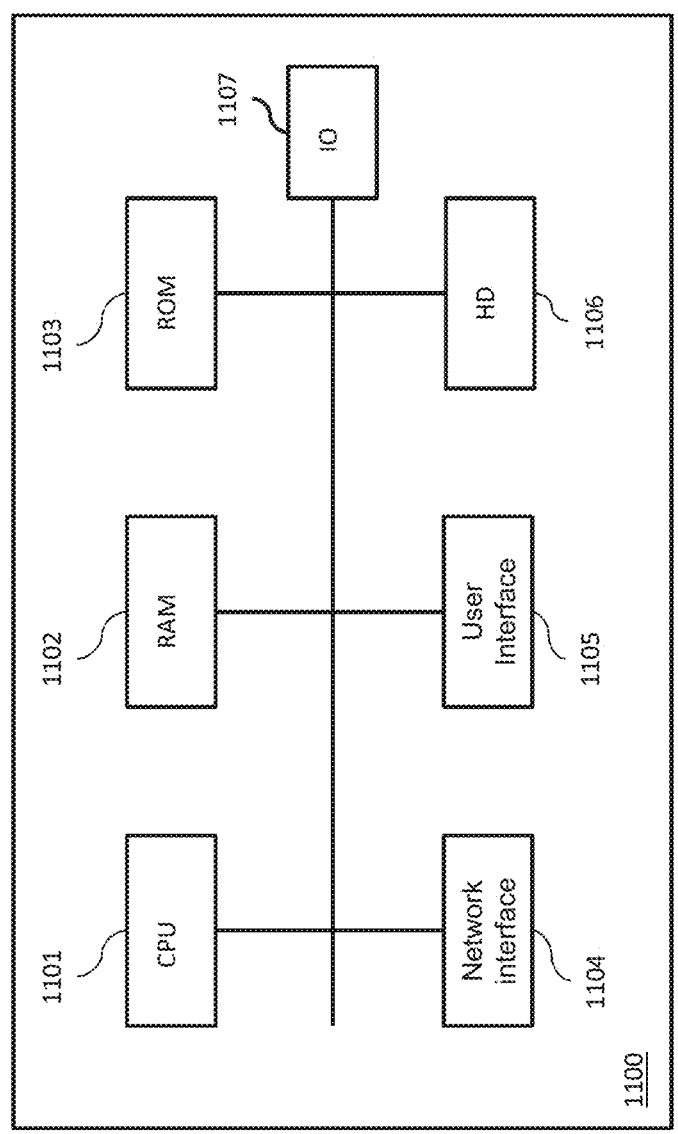
FIG. 11 is a schematic block diagram of a computing device for implementation of one or more embodiments of the invention.

FIG. 11 is a schematic block diagram of a computing device 900 for implementation of one or more embodiments of the invention. The computing device 1100 may be a device such as a micro-computer, a workstation or a light portable device. The computing device 900 comprises a communication bus connected to:

a central processing unit 1101, such as a microprocessor, denoted CPU;

a random access memory 1102, denoted RAM, for storing the executable code of the method of embodiments of the invention as well as the registers adapted to record variables and parameters necessary for implementing the method for reading and writing the manifests and/or for encoding the video and/or for reading or generating the Data under a given file format, the memory capacity thereof can be expanded by an optional RAM connected to an expansion port for example;

a read only memory 1103, denoted ROM, for storing computer programs for implementing embodiments of the invention;

a network interface 1104 is typically connected to a communication network over which digital data to be processed are transmitted or received. The network interface 1104 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 1101;

a user interface 1105 for receiving inputs from a user or to display information to a user;

a hard disk 1106 denoted HD an I/O module 1107 for receiving/sending data from/to external devices such as a video source or display The executable code may be stored either in read only memory 1103, on the hard disk 906 or on a removable digital medium such as for example a disk. According to a variant, the executable code of the programs can be received by means of a communication network, via the network interface 1104, in order to be stored in one of the storage means of the communication device 1100, such as the hard disk 1106, before being executed.

The central processing unit 1101 is adapted to control and direct the execution of the instructions or portions of software code of the program or programs according to embodiments of the invention, which instructions are stored in one of the aforementioned storage means. After powering on, the CPU 1101 is capable of executing instructions from main RAM memory 1102 relating to a software application after those instructions have been loaded from the program ROM 1103 or the hard-disc (HD) 1106 for example. Such a software application, when executed by the CPU 1101, causes the steps of a method according to embodiments to be performed.

Alternatively, the present invention may be implemented in hardware (for example, in the form of an Application Specific Integrated Circuit or ASIC).

The present invention may be embedded in a device like a camera, a smartphone or a tablet that acts as a remote controller for a TV, for example to zoom in onto a particular region of interest. It can also be used from the same devices to have personalized browsing experience of the TV program by selecting specific areas of interest. Another usage from these devices by a user is to share with other connected devices some selected sub-parts of his preferred videos. It can also be used in smartphone or tablet to monitor what happened in a specific area of a building put under surveillance provided that the surveillance camera supports the generation part of this invention.

According to a first aspect of the invention there is provided a method of encapsulating an encoded bitstream representing one or more images, the method comprising:

providing tile description information comprising spatial parameters for dividing an image area into one or more tiles;

providing tile picture item information identifying a portion of the bitstream representing a tile of a single image;

providing reference information linking said tile picture item to said tile description information, and outputting said bitstream together with said provided information as an encapsulated data file.

The output may be performed according to a defined standard, and is readable and decodable.

A method according to the first aspect makes it possible to easily identify, select and extract tiles from, for example, ultra-high resolution images (4K2K, 8K4K . . . ), by parsing syntax elements and without complex computation.

The description tools of the metadata boxes of the ISO Base Media File Format can be extended. In particular, it makes it possible to associate tile description with information items.

Parts of the 'meta' boxes hierarchy can be extended so as to provide additional description tools and especially to support tile-based access within still images.

A method according to the first aspect makes it possible to easily extract, from an encoded HEVC Still Picture, a region of interest based on HEVC tiles.

Embodiments of the invention provide tile description support and tile access for still images encoded according to the HEVC standard.

This makes it possible to preserve the region of interest feature available for video tracks for still image. In general, parts of a still picture corresponding to a user-defined region of interest can be identified and easily extracted for rendering or transmission to media players.

For example, said encapsulated encoded bitstream also contains information identifying a timed portion of said data stream corresponding to a video sequence.

Therefore, double indexing can be provided on a single piece of data that provides the same access facilities to the video as in some still images that are part of this video.

For example, tile description information includes a set of spatial parameters for each tile picture item.

For example, tile description information includes spatial parameters common to more than one tile picture item.

For example, tile description information is embedded in the bitstream.

For example, tile description information is provided as metadata.

For example, the reference information includes a reference type, and additional descriptive metadata including said tile description information.

For example, the reference information includes a reference type, and a reference parameter relating to said tile description information The method may further comprise providing a metadata item for referencing said tile description information in the bitstream.

For example, tile picture items are grouped and wherein the reference information is provided for linking a group of tile picture items to said tile description information.

For example, all references linking metadata items to another item are included in a single reference box in the encapsulated data file.

For example, all the relationships from one item, of any type, are stored in a single item information descriptor.

For example, wherein said outputting is performed by a server module for adaptive streaming.

For example, said outputting is performed for storage into a memory.

For example, said outputting is performed to a display module for display.

For example, said outputting is performed by a communication module for transmission.

For example, said encapsulated data file corresponds to a standardized file format.

For example, said encapsulated data file is decodable and playable.

According to a second aspect of the invention there is provided a method of processing an encapsulated data file including an encoded bitstream corresponding to one or more images, and information including tile description information comprising spatial parameters for dividing an image area into one or more tiles, the method comprising:
  selecting an image region of interest,
  identifying, from said tile description information, tiles which correspond to the selected area of interest,
  selecting one or more tile picture items linked to said identified tiles, each tile picture item identifying a portion of the bitstream representing a tile of a single image,
  extracting a portion of the bitstream identified by the selected tile picture item(s), and
  outputting said extracted bitstream portion.

For example, wherein said outputting is performed by a server module for adaptive streaming.

For example, said outputting is performed for storage into a memory.

For example, said outputting is performed to a display module for display.

For example, said outputting is performed by a communication module for transmission.

For example, said encapsulated data file corresponds to a standardized file format.

For example, said encapsulated data file is decodable and playable.

According to a third aspect of the invention there is provided a method of processing image data representing at least one image for encapsulation into an encapsulation file, the method comprising:
  obtaining a spatial subdivision of said at least one image into a plurality of image portions,
  determining at least one portion identification data identifying a data portion within said image data, representing an image portion of said plurality,
  encapsulating said image data into said encapsulation file along with at least:
    subdivision description data representing said subdivision of said at least one image,
    said portion identification data, and
    reference data linking said subdivision description data and said portion identification data.

For example, said image data represent a plurality of images of a video sequence, and the method further comprises determining at least one time identification data identifying a data portion within said image data, representing a time portion of said video sequence, and said image data are encapsulated along with said time identification data.

For example, a plurality of portion identification data are determined respectively representing a same image portion of the images of said time portion of said video sequence.

For example, at least said subdivision description data is encapsulated as metadata to the image data.

For example, said spatial subdivision is embedded in a bitstream containing said image data.

For example, respective portion identification data are determined for each image portion.

For example, common portion identification data are determined for a plurality of image portions.

The method may further comprise outputting said encapsulation file into a bitstream for adaptive streaming by a server device.

The method may further comprise outputting said encapsulation file into a bitstream for transmission to a display device for displaying said image data.

The method may further comprise outputting said encapsulation file into a bitstream for transmission to a client device.

The method may further comprise storing said encapsulation file into a storage device.

For example, the reference data includes a reference type, and additional descriptive metadata including said subdivision description data.

For example, the reference data includes a reference type and a reference parameter relating to said subdivision description data.

For example, said subdivision description data is referenced in a metadata item.

For example, portion identification data are grouped and wherein the reference data links a group of portion identification data to said portion identification data.

For example, said encapsulated file comprises a single reference box containing all reference data for the image data.

For example, said encapsulated file comprises a description containing a representation of the relationships between said subdivision description data, portion identification data and reference data.

According to a fourth aspect of the invention, there is provided a method of processing an encapsulation file comprising:
  image data representing at least one image,
  subdivision description data representing a spatial subdivision of said at least one image into a plurality of image portions,
  at least one portion identification data identifying a data portion within said image data, representing an image portion of said plurality, and
  reference data linking said subdivision description data and said portion information,
  the method comprising:
  determining a region of interest in said at least one image,
  determining, based on said subdivision description data, at least one image portion, belonging to said region of interest,
  accessing, based on said reference data, at least one portion identification data identifying a data portion within said image data, representing said at least one image portion belonging to said region of interest, and
  extracting said data portion within said image data.

For example, said image data comprise a plurality of images of a video sequence, and said encapsulation file further comprises at least one time identification data identifying a data portion within said image data, representing a time portion of said video sequence, the region of interest being determined for the images of said time portion of said video sequence and the data portions corresponding to said region of interest in a plurality of images of said time portion of said video sequence are extracted.

For example, a plurality of portion identification data respectively represent a same image portion of the images of said time portion of said video sequence.

For example, at least said subdivision description data is encapsulated as metadata to the image data.

For example, respective portion identification data are determined for each image portion.

For example, common portion identification data are determined for a plurality of image portions.

The method may further comprise receiving said encapsulation file as a bitstream adaptively streamed by a server device.

The method may further comprise displaying said region of interest.

For example, the reference data includes a reference type, and additional descriptive metadata including said subdivision description data.

For example, the reference data includes a reference type and a reference parameter relating to said subdivision description data.

For example, said subdivision description data is referenced in a metadata item.

For example, portion identification data are grouped and wherein the reference data links a group of portion identification data to said portion identification data.

For example, said encapsulated file comprises a single reference box containing all reference data for the image data.

For example, said encapsulated file comprises a description containing a representation of the relationships between said subdivision description data, portion identification data and reference data.

According to a fifth aspect of the invention, there is provided a device configured to implement a method according to the first aspect.

The device may comprise:
- a processing unit configured to provide tile description information comprising spatial parameters for dividing an image area into one or more tiles; provide tile picture item information identifying a portion of the bitstream representing a tile of a single image; provide reference information linking said tile picture item to said tile description information, and
- a communication unit configured to output said bitstream together with said provided information as an encapsulated data file.

According to a sixth aspect of the invention, there is provided a device configured to implement a method according to the second aspect.

The device may be configured to process an encapsulated data file including an encoded bitstream corresponding to one or more images, and information including tile description information comprising spatial parameters for dividing an image area into one or more tiles. The device may also comprise:
- a processing unit configured to select an image region of interest, identify, from said tile description information, tiles which correspond to the selected area of interest, select one or more tile picture items linked to said identified tiles, each tile picture item identifying a portion of the bitstream representing a tile of a single image, extract a portion of the bitstream identified by the selected tile picture item(s), and
- a communication unit configured to output said extracted bitstream portion.

According to a seventh aspect of the invention, there is provided a device configured to implement a method according to the third aspect.

The device may be configured to process image data representing at least one image for encapsulation into an encapsulation file, and the device may comprise a processing unit configured to obtain a spatial subdivision of said at least one image into a plurality of image portions, determine at least one portion identification data identifying a data portion within said image data, representing an image portion of said plurality, encapsulate said image data into said encapsulation file along with at least:
- subdivision description data representing said subdivision of said at least one image,
- said portion identification data, and
- reference data linking said subdivision description data and said portion identification data.

According to an eighth aspect of the invention, there is provided a device configured to implement a method according to the fourth aspect.

The device may be configured to process an encapsulation file comprising:
- image data representing at least one image,
- subdivision description data representing a spatial subdivision of said at least one image into a plurality of image portions,
- at least one portion identification data identifying a data portion within said image data, representing an image portion of said plurality, and
- reference data linking said subdivision description data and said portion information.

The device may also comprise a processing unit configured to determine a region of interest in said at least one image, determine, based on said subdivision description data, at least one image portion, belonging to said region of interest, access, based on said reference data, at least one portion identification data identifying a data portion within said image data, representing said at least one image portion belonging to said region of interest, and extract said data portion within said image data.

According to a ninth aspect of the invention, there is provided a system comprising:
- a first device according to the fifth of seventh aspect, and
- a second device according to the sixth of eighth aspect for processing files from said first device.

According to a tenth aspect of the invention there are provided computer programs and computer program products comprising instructions for implementing methods according to the first, second, third and/or fourth aspect(s) of the invention, when loaded and executed on computer means of a programmable apparatus.

According to a eleventh aspect of the invention there are provided a method of encapsulating an encoded bitstream representing one or more images, the method comprising:
- providing description of images and/or sub-image pictures identifying portions of the bitstream representing said images and/or sub-images of said images;
- providing description of at least one composite picture formed by one or more images and/or sub-image pictures; and
- outputting said bitstream together with said provided composite picture description as an encapsulated data file.

In an embodiment, the provided composite picture description is listed in a metadata box.

In an embodiment, the provided composite picture description is signaled by a composite picture item.

In an embodiment, the method further comprises providing reference information linking said composite picture description to said images and/or sub-image pictures forming the composite picture, and further outputting said bitstream together with said provided reference information in the encapsulated data file.

In an embodiment, the provided reference information includes a reference item.

In an embodiment, the provided reference information comprises information which indicates if image and/or sub-image pictures forming part of the composite picture are spatial parts or based on images.

In an embodiment, the method further comprises
providing images and/or sub-image description information comprising display parameters relating to one or more image and/or sub-image pictures, said reference information linking said composite picture item to the image and/or sub-image description information.

In an embodiment, at least two image and/or sub-image pictures forming part of the composite picture identify portions of the bitstream representing two different images and/or sub-images of at least two different images.

In an embodiment, the method further comprises
comparing the configurations of decoding methods used for decoding the at least two different images, and
if the configurations are similar, then providing only one configuration item identifying the configuration of a decoding method, for the composite picture, and
and further outputting said bitstream together with said provided configuration item in the encapsulated data file.

According to a twelfth aspect of the invention, there are provided a method of processing an encapsulated data file including an encoded bitstream corresponding to one or more images, and information including a composite picture description for at least one composite picture, a composite picture being formed by images and/or sub-image pictures identifying portions of the bitstream representing images and/or sub-images of images, the method comprising:
selecting at least one composite picture;
determining the images and/or sub-images forming the composite picture; and
displaying said composite picture.

In an embodiment, the provided composite picture description is listed in a metadata box.

In an embodiment, the provided composite picture description is signaled by a composite picture item.

In an embodiment, the encapsulated data file further including reference information linking said composite picture description to said images and/or sub-image pictures forming the composite picture, and further outputting said bitstream together with said provided reference information in the encapsulated data file.

In an embodiment, the reference information includes a reference item.

In an embodiment, the reference information comprises information which indicates if image and/or sub-image pictures forming part of the composite picture are spatial parts or based on images.

In an embodiment, the encapsulated data file further comprising images and/or sub-image description information comprising display parameters relating to one or more image and/or sub-image pictures, said reference information linking said composite picture item to the image and/or sub-image description information.

In an embodiment, at least two image and/or sub-image pictures forming part of the composite picture identify portions of the bitstream representing two different images and/or sub-images of at least two different images.

In an embodiment, the encapsulated data file further comprising only one configuration item identifying the configuration of a decoding method for the composite picture.

In an embodiment, the configuration of the decoding method is the HEVC standard configuration.

According to a thirteenth aspect of the invention, there are provided a method of encapsulating an encoded bitstream representing one or more images, the method comprising:
providing at least one cropped picture representing a portion of an image picture or a sub-image picture identifying portions of the bitstream representing images or sub-images of images;
providing cropped picture information identifying the cropped picture; and
outputting said bitstream together with said provided cropped picture information as an encapsulated data file.

According to a fourteenth aspect of the invention, there are provided a method of processing an encapsulated data file including an encoded bitstream corresponding to one or more images, and information including cropped picture information for at least one cropped picture, a cropped picture representing a portion of an image or a sub-image identifying portions of the bitstream representing images or sub-images of images, the method comprising:
selecting at least one cropped picture; and
displaying said cropped image.

According to a fifteenth aspect of the invention, there is provided a device configured to implement a method according to the eleventh aspect.

The device may also comprise:
a processing unit configured to provide description of images and/or sub-image pictures identifying portions of the bitstream representing said images and/or sub-images of said images; to provide description of at least one composite picture formed by one or more images and/or sub-image pictures, and
a communication unit configured to output said bitstream together with said provided composite picture description as an encapsulated data file.

According to a sixteenth aspect of the invention, there is provided a device configured to implement a method according to the twelfth aspect.

The device may also comprise:
a processing unit to select at least one composite picture; to determine the images and/or sub-images forming the composite picture; and
a display unit configured to display said composite picture.

According to a seventeenth aspect of the invention, there is provided a device configured to implement a method according to the thirteenth aspect.

The device may also comprise:
a processing unit to provide at least one cropped picture representing a portion of an image picture or a sub-image picture identifying portions of the bitstream representing images or sub-images of images; to provide cropped picture information identifying the cropped picture; and
a communication unit to output said bitstream together with said provided cropped picture information as an encapsulated data file.

According to a eighteenth aspect of the invention, there is provided a device configured to implement a method according to the fourteenth aspect.

The device may also comprise
- a processing unit to select at least one cropped picture; and
- a display unit to display said cropped image.

According to a nineteenth aspect of the invention, there is provided a system comprising:
- a first device according to the eleventh or thirteenth aspect, and
- a second device respectively according to the twelfth or fourteenth aspect for processing files from said first device.

According to a twentieth aspect of the invention there are provided computer programs and computer program products comprising instructions for implementing methods according to the eleventh, twelfth, thirteenth and/or fourteenth aspect(s) of the invention, when loaded and executed on computer means of a programmable apparatus.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for generating an image file based on a plurality of images, the method comprising:
   generating a media data portion based on the plurality of images; and
   generating a metadata portion that includes offset information for identifying a data position of each of the plurality of images within the media data portion, and includes composition image information relating to a composition image that is based on the plurality of images,
   wherein the image file includes the media data portion and the metadata portion, and
   wherein the composition image information includes width information representing a width of the composition image and height information representing a height of the composition image.

2. The method according to claim 1, wherein the composition image information includes information representing a spatial offset of each of the plurality of images within the composition image.

3. The method according to claim 2, wherein the spatial offset represents a horizontal offset and a vertical offset of each of the plurality of images within the composition image.

4. The method according to claim 1, wherein the metadata portion includes itemID of each of the composition image and the plurality of images.

5. The method according to claim 1, wherein the composition image information includes number information representing a number of images in the plurality of images to be used for generating the composition image.

6. The method according to claim 1, wherein the composition image information includes number information representing a number of images in a row direction and a number of images in a column direction within the composition image.

7. The method according to claim 5, wherein the metadata portion includes an item reference for linking the composition image with the number of images.

8. The method according to claim 1, wherein the composition image information further includes layering information to layer the plurality of images to obtain the composition image.

9. The method according to claim 1, wherein at least part of the plurality of images share the same decoder configuration.

10. The method according to claim 1, wherein the composition image is identified by a specific item type.

11. The method according to claim 1, wherein the composition image is signaled as a default image to be displayed by a client.

12. The method according to claim 1, wherein the metadata portion includes an item_type of each of the composition image and the plurality of images.

13. The method according to claim 12, wherein the item_type of the composition image is different from the item_type of each of the plurality of images, and the item_type of each of the plurality of images indicates encoding format.

14. The method according to claim 12, wherein the item_type of each of the plurality of images is hvc1.

15. The method according to claim 1, wherein the offset information is with ItemLocationBox.

16. A device for generating an image file based on a plurality of images, the device comprising:
    a hardware processor; and
    a memory storing one or more programs configured to be executed by the hardware processor, the one or more programs including instructions for:
    generating a media data portion based on the plurality of images, and
    generating a metadata portion that includes offset information for identifying a data position of each of the plurality of images within the media data portion, and includes composition image information relating to a composition image that is based on the plurality of images,
    wherein the image file includes the media data portion and the metadata portion, and
    wherein the composition image information includes width information representing a width of the composition image and height information representing a height of the composition image.

17. The device according to claim 16, wherein the one or more programs further include instructions for generating the composition image to have the width and the height represented by the composition image information.

18. The device according to claim 16,
    wherein the composition image information includes information representing a spatial offset of each of the plurality of images within the composition image, and
    wherein the one or more programs further include instructions for generating the composition image by composing one or more images based on the spatial offset represented by the composition image information.

19. The device according to claim 16,
wherein the composition image information includes number information representing a number of images in the plurality of images to be used for generating the composition image, and
wherein the one or more programs further include instructions for generating the composition image by composing one or more images whose number is represented by the composition image information.

20. The device according to claim 16, wherein the metadata portion includes itemID of each of the composition image and the plurality of images.

21. The device according to claim 16, wherein the metadata portion includes an item_type of each of the composition image and the plurality of images.

22. The device according to claim 21, wherein the item_type of the composition image is different from the item_type of each of the plurality of images, and the item_type of each of the plurality of images indicates encoding format.

23. The device according to claim 21, wherein the item_type of each of the plurality of images is hvc1.

24. The device according to claim 16, wherein the offset information is with ItemLocationBox.

25. A method for displaying an image according to an image file, the method comprising:
obtaining the image file that includes a metadata portion and a media data portion based on a plurality of images, wherein the metadata portion includes offset information for identifying a data position of each of the plurality of images within the media data portion, and includes composition image information relating to a composition image that is based on the plurality of images; and
displaying the composition image by using both the offset information and the composition image information,
wherein the composition image information includes width information representing a width of the composition image and height information representing a height of the composition image.

26. The method according to claim 25, further comprising:
identifying, from the image file, images in the plurality of images to be used for generating the composition image; and
generating the composition image based on the images identified and the composition image information.

27. The method according to claim 26, wherein the generating includes generating the composition image to have the width and the height that are represented by the composition image information.

28. The method according to claim 26,
wherein the composition image information includes information representing a spatial offset of each of the plurality of images, and
wherein the generating includes generating the composition image by composing the plurality of images according to the spatial offset.

29. The method according to claim 26,
wherein the composition image information includes number information representing a number of images in a row direction and a number of images in a column direction within the composition image, and
wherein the generating includes generating the composition image by composing the plurality of images according to the number of images in the row direction and the number of images in the column direction.

30. The method according to claim 26,
wherein the metadata portion includes an item reference for linking the composition image with the number of images, and
wherein the generating includes generating the composition image by composing the plurality of images according to the item reference.

31. The method according to claim 26,
wherein the composition image information includes layering information to layer the plurality of images to obtain the composition image, and
wherein the generating includes generating the composition image by composing the plurality of images according to the layering information.

32. The method according to claim 26, wherein at least part of the plurality of images share the same decoder configuration.

33. The method according to claim 26, wherein the composition image is identified by a specific item type.

34. The method according to claim 26, wherein the composition image is signaled as a default image to be displayed by a client.

35. The method according to claim 25, wherein the metadata portion includes itemID of each of the composition image and the plurality of images.

36. The method according to claim 25, wherein the metadata portion includes an item_type of each of the composition image and the plurality of images.

37. The method according to claim 36, wherein the item_type of the composition image is different from the item_type of each of the plurality of images, and the item_type of each of the plurality of images indicates encoding format.

38. The method according to claim 36, wherein the item_type of each of the plurality of images is hvc1.

39. The method according to claim 25, wherein the offset information is with ItemLocationBox.

40. A device for displaying an image according to an image file, the device comprising:
a hardware processor; and
a memory storing one or more programs configured to be executed by the hardware processor, the one or more programs including instructions for:
obtaining the image file that includes a metadata portion and a media data portion based on a plurality of images, wherein the metadata portion includes offset information for identifying a data position of each of the plurality of images within the media data portion, and includes composition image information relating to a composition image that is based on the plurality of images, and
displaying the composition image by using both the offset information and the composition image information,
wherein the composition image information includes width information representing a width of the composition image and height information representing a height of the composition image.

41. The device according to claim 40, wherein the one or more programs further include instructions for:
identifying, from the image file, one or more images to be used for generating the composition image, and
generating the composition image based on the images identified and the composition image information.

42. The device according to claim 40, wherein the one or more programs further include instructions for generating the composition image to have the width and the height that are represented by the composition image information.

43. The device according to claim 40,
wherein the composition image information includes information representing a spatial offset of each of the one or more images, and
wherein the one or more programs further include instructions for generating the composition image by composing the one or more images according to the spatial offset.

44. The device according to claim 40,
wherein the composition image information includes number information representing a number of images in a row direction and a number of images in a column direction within the composition image, and
wherein the one or more programs further include instructions for generating the composition image by composing the plurality of images according to the number of images in the row direction and the number of images in a column direction.

45. The device according to claim 40, wherein the composition image is identified by a specific item_type.

46. The device according to claim 40, wherein the metadata portion includes itemID of each of the composition image and the plurality of images.

47. The device according to claim 40, wherein the metadata portion includes item_type of each of the composition image and the plurality of images.

48. The device according to claim 47, wherein the item_type of the composition image is different from the item_type of each of the plurality of images, and the item_type of each of the plurality of images indicates encoding format.

49. The device according to claim 47, wherein the item_type of each of the plurality of images is hvc1.

50. The device according to claim 40, wherein the offset information is with ItemLocationBox.

51. A non-transitory computer-readable storage medium storing instructions to cause a computer to perform a method for generating an image file based on a plurality of images, the method comprising:
generating a media data portion based on the plurality of images; and
generating a metadata portion that includes offset information for identifying a data position of each of the plurality of images within the media data portion, and includes composition image information relating to a composition image that is based on the plurality of images,
wherein the image file includes the media data portion and the metadata portion, and
wherein the composition image information includes width information representing a width of the composition image and height information representing a height of the composition image.

52. A non-transitory computer-readable storage medium storing instructions for a computer to perform a method for displaying an image according to an image file, the method comprising:
obtaining the image file that includes a metadata portion and a media data portion based on a plurality of images, wherein the metadata portion includes offset information for identifying a data position of each of the plurality of images within the media data portion, and includes composition image information relating to a composition image that is based on the plurality of images; and
displaying the composition image by using both the offset information and the composition image information,
wherein the composition image information includes width information representing a width of the composition image and height information representing a height of the composition image.

* * * * *